US011695861B2

(12) United States Patent
Bulkley et al.

(10) Patent No.: US 11,695,861 B2
(45) Date of Patent: *Jul. 4, 2023

(54) SCREEN PROTECTOR INSTALLATION TOOL AND KIT

(71) Applicant: Otter Products, LLC, Fort Collins, CO (US)

(72) Inventors: Ross V. Bulkley, Loveland, CO (US); Bryan W. Goings, Fort Collins, CO (US); Elise S. Niedringhaus, Fort Collins, CO (US); George Russell Price, Fort Collins, CO (US); Jamie L. Johnson, Fort Collins, CO (US); David J. Bohman, Fort Collins, CO (US); Richard W. Vinson, Fort Collins, CO (US); Zachariah J. Pickett, Fort Collins, CO (US); Jonathan B. Miksch, Fort Collins, CO (US); Jonathan H. Guerdrum, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/496,325

(22) Filed: Oct. 7, 2021

(65) Prior Publication Data

US 2022/0030098 A1   Jan. 27, 2022

Related U.S. Application Data

(63) Continuation of application No. 17/184,044, filed on Feb. 24, 2021, which is a continuation of application
(Continued)

(51) Int. Cl.
*H04M 1/02* (2006.01)
*H04B 1/3888* (2015.01)
(Continued)

(52) U.S. Cl.
CPC ......... *H04M 1/0266* (2013.01); *B29C 66/861* (2013.01); *G06F 1/1637* (2013.01); *H04B 1/3888* (2013.01); *B29L 2031/3437* (2013.01)

(58) Field of Classification Search
CPC ............... H04M 1/0266; B29C 66/861; B29C 63/0004; B29C 63/0047; B29C 63/02;
(Continued)

(56) References Cited

U.S. PATENT DOCUMENTS 2,908,986 A   10/1959   Adolf
4,547,255 A   10/1985   Yow
(Continued)

FOREIGN PATENT DOCUMENTS

CA   2449951 A1   5/2005
CA   2606441 A1   11/2006
(Continued)

OTHER PUBLICATIONS

"BODYGUARDZ", Product Packaging, 2006, NLU Products, LLC, Draper, Utah.
(Continued)

*Primary Examiner* — Lester G Kincaid
*Assistant Examiner* — Maryam Soltanzadeh

(57) ABSTRACT

A screen protector installation tool includes a first portion, a second portion, and an elastic element. The first portion and the second portion each have corner alignment features. The second portion slidably engages the first portion to form a receiving area for receiving an electronic device between the corner alignment features to align the electronic device in the receiving area of the screen protector installation tool when one of the first portion and the second portion is moved relative to the other of the first portion and the second portion. The elastic element is configured to apply a force to move the one of the first portion and the second portion
(Continued)

relative to the other of the first portion and the second portion to capture the electronic device in the receiving area between the corner alignment features.

20 Claims, 29 Drawing Sheets

Related U.S. Application Data

No. 17/172,283, filed on Feb. 10, 2021, which is a continuation-in-part of application No. 16/986,975, filed on Aug. 6, 2020, now Pat. No. 11,044,354, which is a continuation of application No. 16/694,237, filed on Nov. 25, 2019, now Pat. No. 10,841,409.

(60) Provisional application No. 62/886,493, filed on Aug. 14, 2019, provisional application No. 62/783,283, filed on Dec. 21, 2018.

(51) Int. Cl.
*G06F 1/16* (2006.01)
*B29C 65/00* (2006.01)
*B29L 31/34* (2006.01)

(58) Field of Classification Search
CPC ........... B29C 2063/0008; G06F 1/1637; G06F 2200/1633; G06F 2200/1634; G06F 1/1656; G06F 1/1626; H04B 1/3888; B29L 2031/3437; B29L 2031/3475; B32B 38/1833; B32B 37/18; B32B 37/26; B32B 2037/268; B32B 2457/20; Y10T 29/49; Y10T 156/1082; Y10T 156/1744
See application file for complete search history.

(56) References Cited

U.S. PATENT DOCUMENTS

| | | | |
|---|---|---|---|
| 4,873,270 A | 10/1989 | Aime et al. |
| 5,083,979 A | 1/1992 | Burt |
| 5,132,588 A | 7/1992 | Warman |
| 5,388,691 A | 2/1995 | White |
| 5,484,168 A | 1/1996 | Chigot |
| 5,499,713 A | 3/1996 | Huffer |
| 5,514,730 A | 5/1996 | Mazurek et al. |
| RE35,318 E | 8/1996 | Warman |
| 5,548,306 A | 8/1996 | Yates et al. |
| 5,732,414 A | 3/1998 | Monica |
| 5,965,256 A | 10/1999 | Barrera |
| 6,017,079 A | 1/2000 | Warner |
| 6,054,009 A | 4/2000 | Cote et al. |
| 6,227,599 B1 | 5/2001 | Campfield et al. |
| 6,406,758 B1 | 6/2002 | Bottari et al. |
| 6,415,138 B2 | 7/2002 | Sirola et al. |
| 6,491,775 B1 | 12/2002 | Janssen et al. |
| 6,514,624 B2 | 2/2003 | Takemoto |
| 6,614,423 B1 | 9/2003 | Wong et al. |
| 6,800,378 B2 | 10/2004 | Hawa et al. |
| 6,941,056 B2 | 9/2005 | Hirota |
| 7,054,441 B2 | 5/2006 | Pletikosa |
| 7,151,532 B2 | 12/2006 | Schulz |
| 7,158,376 B2 | 1/2007 | Richardson et al. |
| 7,180,735 B2 | 2/2007 | Thomas et al. |
| 7,194,086 B2 | 3/2007 | Pletikosa |
| 7,214,432 B2 | 5/2007 | Merfeld et al. |
| 7,290,654 B2 | 11/2007 | Hodges |
| 7,351,470 B2 | 4/2008 | Draheim et al. |
| 7,389,869 B2 | 6/2008 | Mason, Jr. |
| 7,400,917 B2 | 7/2008 | Wood et al. |
| 7,413,787 B2 | 8/2008 | Vetrovec et al. |
| 7,529,364 B2 | 5/2009 | Buehler |
| 7,743,929 B2 | 6/2010 | Kools |
| 7,784,610 B2 | 8/2010 | Mason |
| 7,799,853 B2 | 9/2010 | Ukei et al. |
| 7,803,292 B2 | 9/2010 | Heki |
| 7,957,524 B2 | 6/2011 | Chipping |
| 7,993,482 B2 | 8/2011 | Begon et al. |
| 8,128,779 B2 | 3/2012 | Ho et al. |
| 8,326,383 B1 | 12/2012 | Patel et al. |
| D676,031 S | 2/2013 | Melville et al. |
| 8,369,072 B1 | 2/2013 | Alonzo et al. |
| 8,393,377 B2 | 3/2013 | Patel et al. |
| 8,517,367 B1 | 8/2013 | Napier |
| 8,564,538 B2 | 10/2013 | Wadsworth |
| 8,567,596 B1 | 10/2013 | Mason, Jr. |
| 8,640,759 B2 | 2/2014 | Chen |
| D705,206 S | 5/2014 | Gengler et al. |
| 8,940,122 B2 | 1/2015 | Cohen et al. |
| 8,944,425 B2 | 2/2015 | Napier |
| 9,192,086 B2 | 11/2015 | Hsu et al. |
| D746,265 S | 12/2015 | Colby et al. |
| 9,254,629 B2 | 2/2016 | Napier |
| D751,556 S | 3/2016 | Conley et al. |
| D751,557 S | 3/2016 | Lane |
| D759,640 S | 6/2016 | Wadsworth |
| D767,550 S | 9/2016 | Beaupre et al. |
| 9,580,626 B2 | 2/2017 | Colby et al. |
| D781,861 S | 3/2017 | Lane et al. |
| 9,588,547 B2 | 3/2017 | Witham et al. |
| D783,024 S | 4/2017 | Conley et al. |
| 9,641,209 B2 | 5/2017 | Roberts et al. |
| 9,662,860 B2 | 5/2017 | Wadsworth |
| 9,701,062 B2 | 7/2017 | Wadsworth et al. |
| 9,701,096 B2 | 7/2017 | Beaupre |
| 9,757,934 B2 | 9/2017 | Wadsworth |
| D800,126 S | 10/2017 | Wadsworth et al. |
| D800,127 S | 10/2017 | Beaupre et al. |
| D800,128 S | 10/2017 | Beaupre et al. |
| D800,129 S | 10/2017 | Wadsworth et al. |
| D800,130 S | 10/2017 | Beaupre et al. |
| D800,131 S | 10/2017 | Wadsworth et al. |
| 9,777,195 B2 | 10/2017 | Colby et al. |
| D802,594 S | 11/2017 | Beaupre et al. |
| D811,404 S | 2/2018 | Wadsworth |
| D811,405 S | 2/2018 | Wadsworth et al. |
| D811,406 S | 2/2018 | MacDonald et al. |
| D811,407 S | 2/2018 | Wadsworth et al. |
| D811,408 S | 2/2018 | Wadsworth et al. |
| 9,902,111 B2 | 2/2018 | Wadsworth et al. |
| D812,061 S | 3/2018 | MacDonald et al. |
| D812,062 S | 3/2018 | MacDonald et al. |
| D812,063 S | 3/2018 | Lane et al. |
| D817,945 S | 5/2018 | Wadsworth et al. |
| D821,384 S | 6/2018 | Jordin et al. |
| 10,009,057 B2 | 6/2018 | Chaves et al. |
| 10,065,365 B2 | 9/2018 | Lane |
| 10,076,872 B2 | 9/2018 | Witham et al. |
| 10,155,370 B2 | 12/2018 | Wadsworth |
| 10,710,294 B1 | 7/2020 | Sorensen et al. |
| 10,841,409 B2 | 11/2020 | Bulkley et al. |
| 2002/0195910 A1 | 12/2002 | Hus et al. |
| 2003/0080947 A1 | 5/2003 | Genest et al. |
| 2003/0110613 A1 | 6/2003 | Ross |
| 2004/0237433 A1 | 12/2004 | Smith |
| 2004/0243686 A1 | 12/2004 | Schilders |
| 2005/0007000 A1 | 1/2005 | Chou et al. |
| 2005/0022924 A1 | 2/2005 | Blackburn |
| 2005/0047589 A1 | 3/2005 | Chang |
| 2005/0279661 A1 | 12/2005 | Hodges |
| 2006/0019113 A1 | 1/2006 | Sparks et al. |
| 2006/0022309 A1 | 2/2006 | Tokunaga et al. |
| 2006/0024263 A1 | 2/2006 | Es et al. |
| 2006/0134406 A1 | 6/2006 | Horigome et al. |
| 2006/0158592 A1 | 7/2006 | Freking et al. |
| 2006/0262405 A1 | 11/2006 | Brumwell |
| 2007/0115387 A1 | 5/2007 | Ho |
| 2007/0205118 A1 | 9/2007 | Westendorf et al. |
| 2007/0297736 A1 | 12/2007 | Sherman et al. |
| 2008/0156423 A1 | 7/2008 | Reuter |
| 2008/0233324 A1 | 9/2008 | Lee et al. |
| 2008/0233326 A1 | 9/2008 | Hegemier et al. |
| 2009/0004478 A1 | 1/2009 | Baetzold et al. |

(56) References Cited

U.S. PATENT DOCUMENTS

| | | |
|---|---|---|
| 2009/0016209 A1 | 1/2009 | Ikeda et al. |
| 2009/0087655 A1 | 4/2009 | Yamada et al. |
| 2009/0110861 A1 | 4/2009 | Sherman |
| 2009/0186181 A1 | 7/2009 | Mase |
| 2009/0257189 A1 | 10/2009 | Wang et al. |
| 2009/0260844 A1 | 10/2009 | Tseng |
| 2009/0301907 A1 | 12/2009 | Mason |
| 2010/0068446 A1 | 3/2010 | McGuire |
| 2011/0039099 A1 | 2/2011 | Sherman et al. |
| 2012/0057287 A1 | 3/2012 | Chaves et al. |
| 2012/0076967 A1 | 3/2012 | Muramatsu |
| 2012/0211171 A1 | 8/2012 | Patel et al. |
| 2012/0276318 A1 | 11/2012 | Franke |
| 2013/0033808 A1 | 2/2013 | Cohen et al. |
| 2013/0171400 A1 | 7/2013 | Lin |
| 2013/0299075 A1 | 11/2013 | Colby et al. |
| 2014/0041799 A1 | 2/2014 | Nam |
| 2015/0047773 A1* | 2/2015 | Wadsworth ......... B29C 63/0004 156/182 |
| 2015/0056395 A1 | 2/2015 | Lin |
| 2015/0257285 A1 | 9/2015 | Wilson et al. |
| 2015/0291854 A1 | 10/2015 | Colby et al. |
| 2015/0299461 A1 | 10/2015 | Suzuki et al. |
| 2016/0043765 A1 | 2/2016 | Ozeki |
| 2018/0081473 A1* | 3/2018 | Seo ...................... G06F 1/3287 |
| 2018/0314298 A1 | 11/2018 | Scaggs |
| 2019/0229763 A1* | 7/2019 | Nebel .................... A45C 13/36 |
| 2020/0198223 A1 | 6/2020 | Sorensen et al. |
| 2020/0204664 A1 | 6/2020 | Bulkley et al. |
| 2020/0234029 A1 | 7/2020 | Fukunaga et al. |

FOREIGN PATENT DOCUMENTS

| | | |
|---|---|---|
| EP | 1018680 A2 | 7/2000 |
| EP | 1939263 A1 | 7/2008 |
| WO | 2009105297 A2 | 8/2009 |
| WO | 2011112817 A1 | 9/2011 |
| WO | 2019140932 A1 | 7/2019 |

OTHER PUBLICATIONS

"How to put a Screen protector on Apple iPhone or just any phone" (Along with screenshots and transcript thereof) Published on Aug. 26, 2008 http://www.youtube.com/watch?v=ATvjrxCXt40.

"ZAGG (ZAGG) Introduces Two New Products at CTIA Wireless Show";Published on Mar. 24, 2010 www.streetinsider.com (Article printed on Sep. 10, 2012).

"ZAGG to Introduce invisibleSHIELD Dry (TM) Nationwide Exclusively Through AT&T"; Published on Jun. 28, 2010 www.businesswire.com (Article printed on Sep. 10, 2012).

* cited by examiner

SCREEN PROTECTOR INSTALLATION TOOL AND KIT

CROSS REFERENCE TO RELATED APPLICATIONS

This application is a continuation of U.S. patent application Ser. No. 17/184,044, filed Feb. 24, 2021, which is a continuation of U.S. patent application Ser. No. 17/172,283, filed Feb. 10, 2021, which is a continuation in part of U.S. patent application Ser. No. 16/986,975, filed Aug. 6, 2020, now U.S. Pat. No. 11,044,354, which is a continuation of U.S. patent application Ser. No. 16/694,237, filed Nov. 25, 2019, now U.S. Pat. No. 10,841,409, which claims priority to U.S. Provisional Patent Application No. 62/783,283, filed Dec. 21, 2018, and to U.S. Provisional Patent Application No. 62/886,493, filed Aug. 14, 2019, all of which are hereby incorporated by reference in their entireties.

BACKGROUND

The present invention relates generally to a tools or guides for properly aligning screen protectors with display screens of electronic devices during installation of the screen protectors.

Screen protectors are used to cover and protect the display screens of electronic devices. Screen protectors may be used to protect, for example, the surface of digital electronic device display components during manufacture, or may be adhered to display screen of a completed device to protect it from damage during normal day-to-day use. At least a portion of the screen protector is often transparent and may permit the use of touch-sensitive features of the electronic device through the screen protector. Screen protectors may be formed of a glass material, such as soda lime glass or fortified glass, or a polymeric material, such as a plastic film or composite of one or more polymers.

Display screens for electronic devices may have a substantially flat surface, a substantially curved surface, or a substantially flat main portion and one or more curved or rounded edge portions.

In some situations, is can be difficult to properly align the screen protector onto the display screen of the electronic device during installation. Poor alignment may result in poor adhesion between the screen protector and the electronic device. Air trapped between the screen protector and display may result in unsightly bubbles that adversely affect the ability to use the display. Additionally, misaligned edges of the screen protector may result in an inability to use a protective case with the installed screen protector, or the screen protector may be inadvertently removed from the electronic device when a protective case is installed on the electronic device.

Improvements in one or more of the foregoing are desired.

SUMMARY

In one exemplary embodiment a tool for assisting in affixing a screen protector to a display of an electronic device is provided. The tool includes a first segment and a second segment slidably attached to the first segment to define an interior of the tool. The first segment has a first side, a second side attached to the first side by a first corner alignment feature, and a third side attached to the second side by a second corner alignment feature. The second segment includes a first side, a second side attached to the first side by a first corner alignment feature, and a third side attached to the second side by a second corner alignment feature. The first and second corner alignment features of the first segment and the first and second corner alignment features of the second segment are configured to center the electronic device in the interior of the tool when the first segment is slid relative to the second segment.

In one more particular embodiment, the first segment includes one or more posts configured to receive a screen protector assembly including the screen protector to be affixed to the display of the electronic device. In another more particular embodiment, the second segment includes one or more posts configured to receive the screen protector assembly. In another more particular embodiment, the one or more posts of the first segment are positioned on the second side of the first segment and the one or more posts of the second segment are positioned on the second side of the second segment.

In another embodiment of any of the above embodiments, the tool further includes a screen protector assembly including the screen protector having a front surface and an opposing rear surface, a first removable film configured to at least partially cover the rear surface of the screen protector, and a second removable film configured to at least partially cover the front surface of the screen protector. In a more particular embodiment, the second removable film includes a first alignment extension including one or more alignment apertures configured to align with the respective one or more posts of the first segment, and a second alignment extension including one or more alignment apertures configured to align with the respective one or more posts of the second segment. In an even more particular embodiment, the one or more alignment apertures of the first alignment extension have a diameter that is greater than a diameter of the one or more alignment apertures of the second alignment extension.

In another more particular embodiment of any of the above embodiments, at least one of a number of the one or more posts of the first segment, a position of the one or more posts of the first segment, and a shape of the one or more posts of the first segment is different than a respective number of the one or more posts of the second segment, a position of the one or more posts of the second segment, and a shape of the one or more posts of the second segment.

In another more particular embodiment of any of the above embodiments, at least a portion of the third side of the first segment is configured to be slidably received within an interior of the first side of the second segment and at least a portion of the third side of the second segment is configured to be slidably received within an interior of the third side of the first segment.

In another more particular embodiment of any of the above embodiments, the first corner alignment feature and the second corner alignment feature of the first segment each comprise a surface forming a corresponding angle between 30° and 60° with the second side of the first segment. In a more particular embodiment, the first corner alignment feature and the second corner alignment feature of the second segment each comprise a surface forming a corresponding angle between 30° and 60° with the second side of the second segment.

In another more particular embodiment of any of the above embodiments, the first segment is substantially identical to the second segment.

In another more particular embodiment of any of the above embodiments, at least one of the first side, the second side, and the third side of the first segment has a different length or a different shape than the respective first side, the second side, and the third side of the second segment.

In another more particular embodiment of any of the above embodiments, the first side of the first segment and the third side of the second segment are configured to be proximate the left side of the electronic device, the second side of the first segment is configured to be proximate the top side of the electronic device, the third side of the first segment and the first side of the second segment are configured to be proximate the right side of the electronic device, and the second side of the second segment is configured to be proximate the bottom side of the electronic device when the electronic device is positioned in the interior of the tool.

In another more particular embodiment of any of the above embodiments, the first segment is configured to be disconnected from the second segment and reattached in a second configuration to form a stand for the electronic device, wherein the first segment is not parallel to the second segment in the second configuration.

In another embodiment a screen protector assembly for use with an electronic device and an installation tool includes a glass screen protector, a removable film, and an application film. The glass screen protector has a length and a width configured to substantially cover a display of the electronic device. The glass screen protector has a front surface and an opposing rear surface that is at least partially covered with a first adhesive configured for adhering the glass screen protector to the display of the electronic device. The removable film at least partially covers the first adhesive on the rear surface of the glass screen protector. The application film is removably adhered to the front surface of the glass screen protector with a second adhesive. The application film has a length that is longer than the length of the glass screen protector and a first end of the adhered application film extends beyond a first edge of the glass screen protector and includes a post aperture for receiving a corresponding post of the installation tool. A second end of the adhered application film extends beyond a second edge of the glass screen protector opposite the first edge and includes a plurality of alignment apertures for receiving corresponding teeth of the installation tool. The post aperture and the alignment apertures of the adhered application film each have a relative orientation to the glass screen protector such that the glass screen protector is aligned with the display of the electronic device when the electronic device is centered in the installation tool and the post aperture and the alignment apertures have received the post and the teeth, respectively.

In another embodiment, a tool for facilitating attaching a screen protector of a screen protector assembly to a display of an electronic device includes a tray, an alignment block, and a spring or biasing element. The tray includes a first corner alignment feature, a second corner alignment feature, and an engagement feature for engaging the screen protector assembly. The tray also includes a movable arm for holding the screen protector assembly on the engagement feature. The alignment block is slidably attached to the tray to define an interior of the tool. The alignment block includes a first corner alignment feature, a second corner alignment feature, and an engagement feature for engaging the screen protector assembly. The biasing element is configured to push the alignment block toward the first and second corner alignment features of the tray to center the electronic device is in the tool for the attaching of the screen protector to the electronic device.

DETAILED DESCRIPTION

Figure 1:
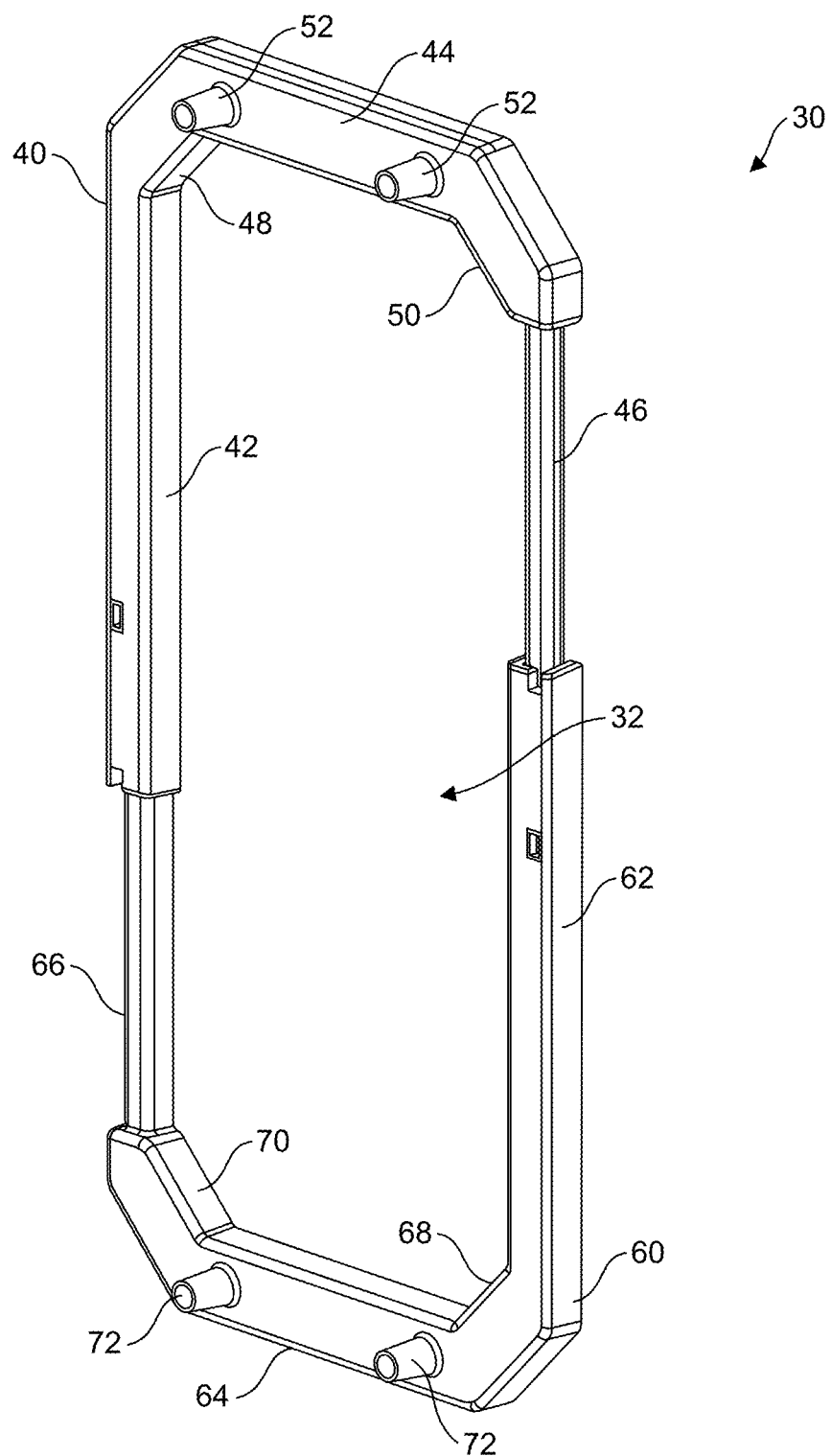
FIG. 1 illustrates a perspective view of an exemplary tool for installing a screen protector on an electronic device.

Referring first to FIGS. 1-6, an exemplary tool 30 for aligning and installing a screen protector 82 (see FIGS. 7-8) onto an electronic device 10 (see FIGS. 2-4) is illustrated.

In some exemplary embodiments, tool 30 includes a first segment 40 and a second segment 60. First segment 40 is illustratively moveable relative to second segment 60 to accommodate a range of sizes of electronic device 10. In some exemplary embodiments, first segment 40 and second segment 60 are slidably coupled relative to each other to receive a variety of electronic devices 10 having different lengths and/or widths.

Figure 2:
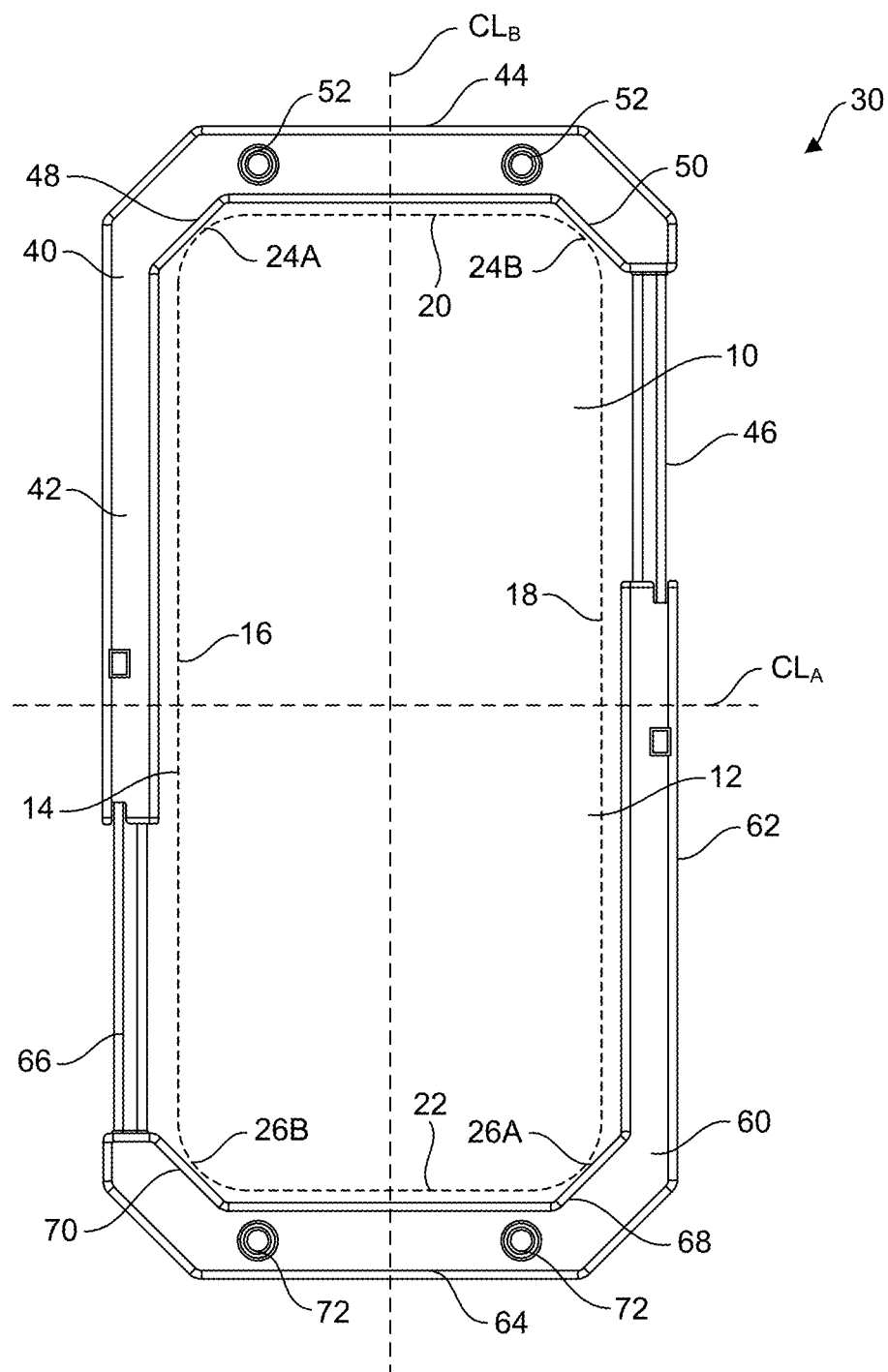
FIG. 2 illustrates a front view of an electronic device positioned in the tool of FIG. 1.

First segment 40 and second segment 60 define an interior 32 of tool 30. As illustrated in FIG. 2, interior 32 is configured to receive an electronic device 10. Electronic device 10 includes a front surface 12 having a display screen 14 onto which the screen protector 82 is to be placed. In some exemplary embodiments, display screen 14 covers only a portion of front surface 12. In some exemplary embodiments, display screen 14 covers the entire front surface 12. In some exemplary embodiments, display screen 14 covers at least a portion of front surface 12 and at least a portion of one or more sides, such as left side 16, right side 18, top side 20, and bottom side 22.

Electronic device 10 includes one or more corners between adjacent sides, such as first top corner 24A formed between left side 16 and top side 20, second top corner 24B formed between right side 18 and top side 20, first bottom corner 26A formed between right side 18 and bottom side 22, and second bottom corner 24B formed between left side 16 and bottom side 22. As illustrated in FIG. 2, in some embodiments each corner 24A, 24B, 26A, 26B is rounded or otherwise smoothed. In other embodiments, one or more corners 24A, 24B, 26A, 26B form a relatively sharp angle. In other embodiments, one or more corners 24A, 24B, 26A, 26B are formed from two or more angles or rounded portions.

Figure 5:
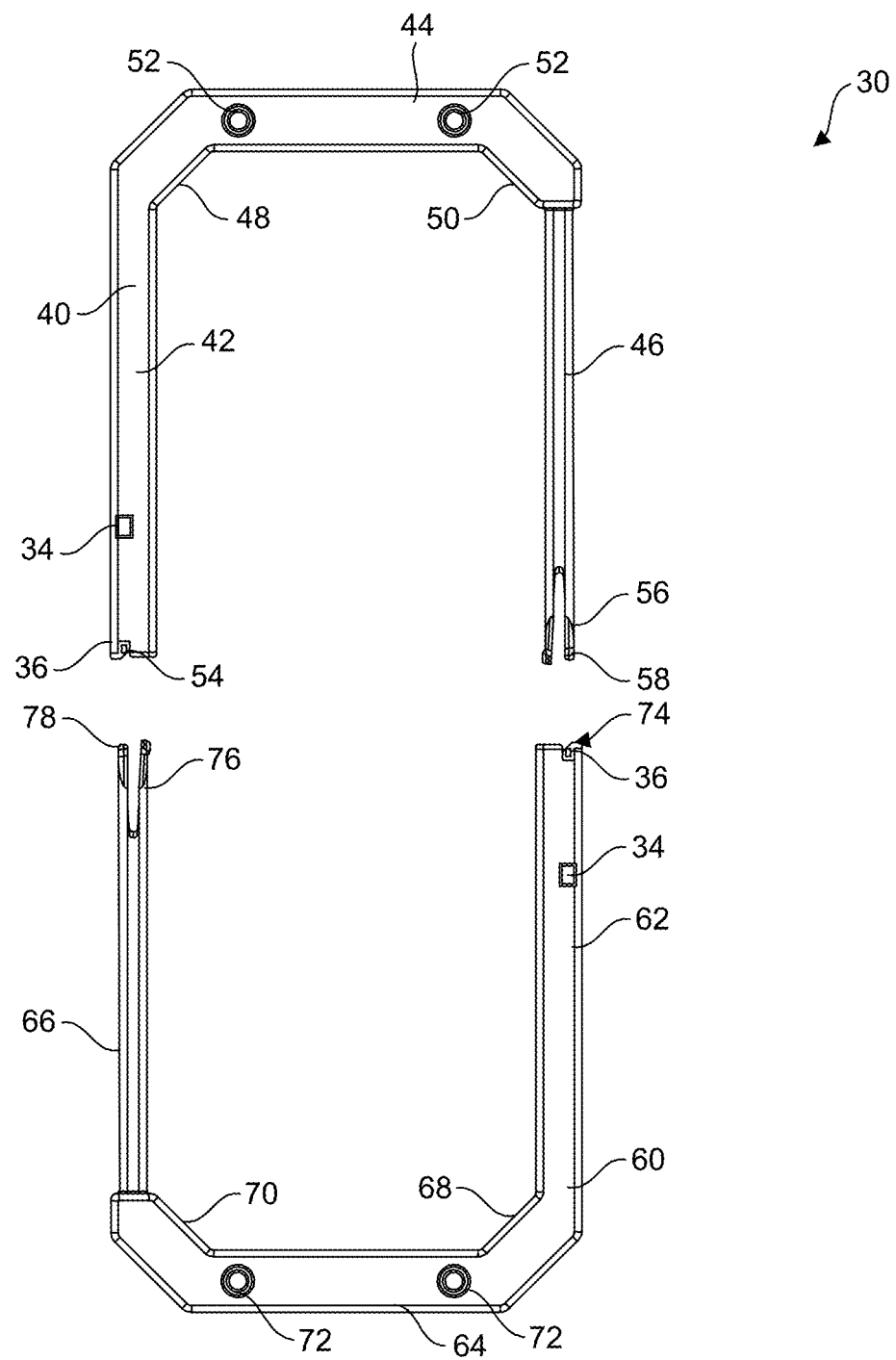
FIG. 5 illustrates a front view of the exemplary tool of FIG. 1 in an unassembled state.
Figure 6:
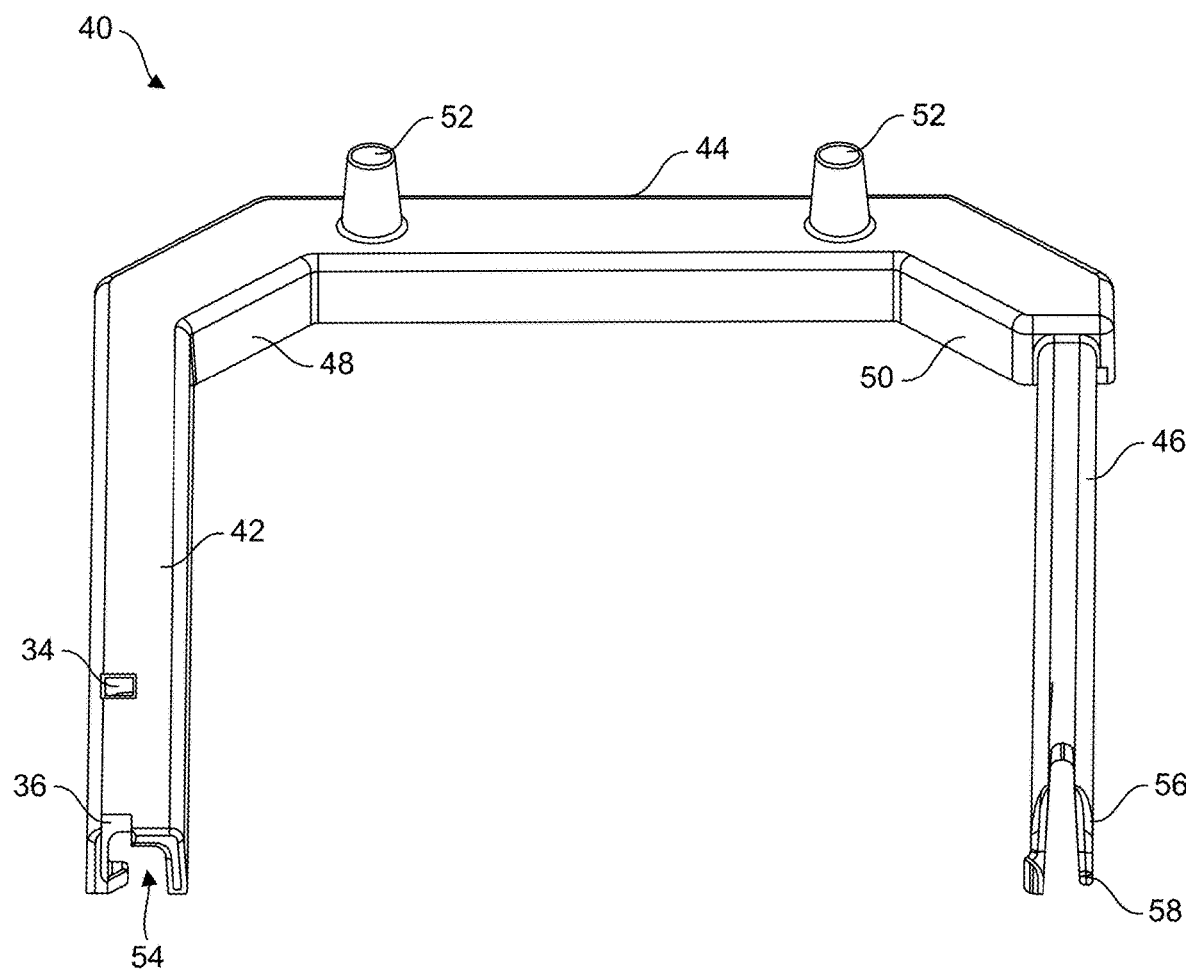
FIG. 6 illustrates a perspective view of a first component of the tool of FIG. 1.
Figure 7:
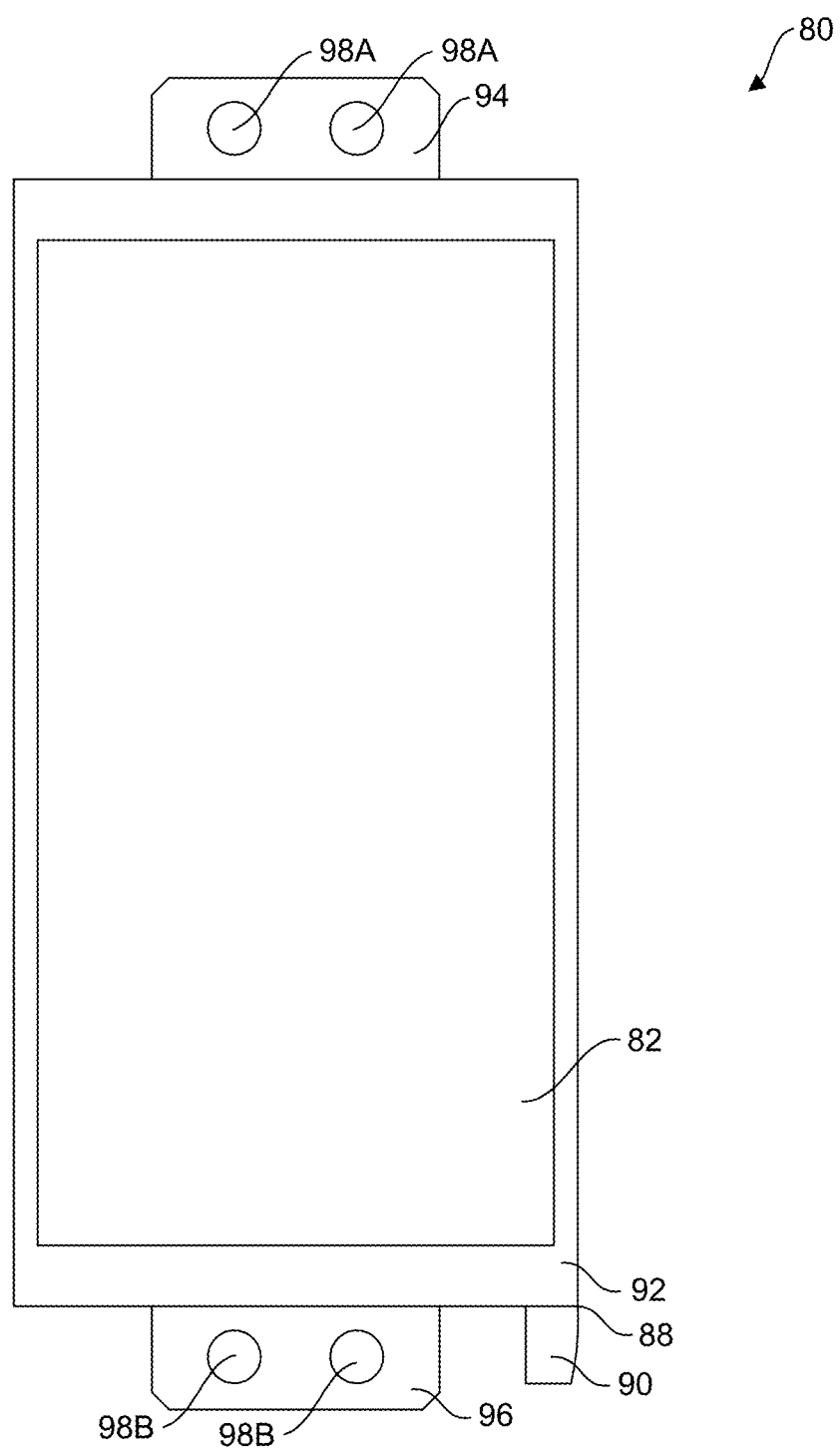
FIG. 7 illustrates an exemplary screen protector assembly for use with the tool of FIG. 1.

Referring next to FIGS. 1, 5, and 6, first segment 40 includes a first side 42, a second side 44, and a third side 46. First side 42 is illustratively parallel to third side 46. Second side 44 is illustratively perpendicular to first side 42 and third side 46. As shown in FIG. 2, first side 42 is configured to be substantially parallel to left side 16 of received electronic device 10. Second side 44 is configured to be substantially parallel to top side 20 of received electronic device 10. Third side 46 is configured to be substantially parallel to right side 18 of received electronic device 10.

A first corner alignment feature 48 is formed between first side 42 and second side 44. A second corner alignment feature 50 is formed between second side 44 and third side 46. Each corner alignment feature 48, 50 is configured to align received electronic device 10 within the interior 32 of tool 30 to allow proper alignment during installation of the screen protector 82. In some embodiments, each corner alignment feature 48, 50 is a surface at an angle greater than 0° and less than 90° with respect to second side 44, such as the 45° illustrated in FIG. 2. In some embodiments, each corner alignment feature 48, 50 forms an angle with second side 44 as little as 10°, 20°, 30°, 40°, 45°, as great as 50°, 60°, 70°, 80°, or within any range defined between any two of the foregoing values, such as 10° to 80°, 30° to 60°, or 40° to 50°.

First segment 40 illustratively includes one or more posts 52 configured to receive a screen protector assembly 80 including screen protector 82. As illustrated in FIG. 2, in some embodiments, second side 44 includes two posts 52. In other embodiments, second side 44 includes a single post 52 or three or more posts 52. In some embodiments, including two or more posts 52 may provide for better stability and alignment of screen protector assembly 80 during the installation process. Although illustrated on second side 44, in other embodiments one or more posts 52 may be positioned on first side 42, third side 46, or elsewhere on first segment 40. In some embodiments, one or more posts 52 includes a hook or catch on a surface opposite that of interior 32 to assist in positioning alignment apertures 98A of screen protector assembly 80 during the installation process (see FIG. 7).

Figure 3:
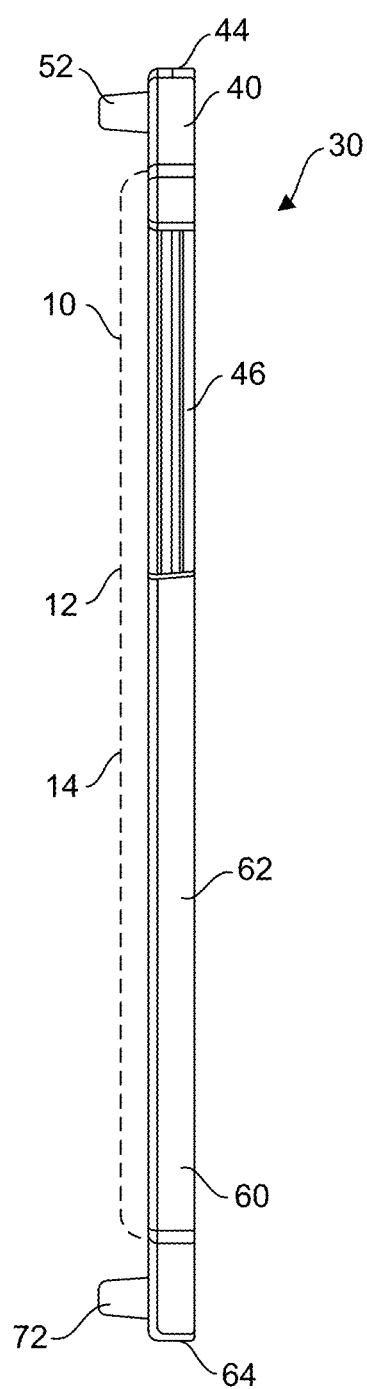
FIG. 3 illustrates a right side view of the electronic device positioned in the tool of FIG. 1.
Figure 4:
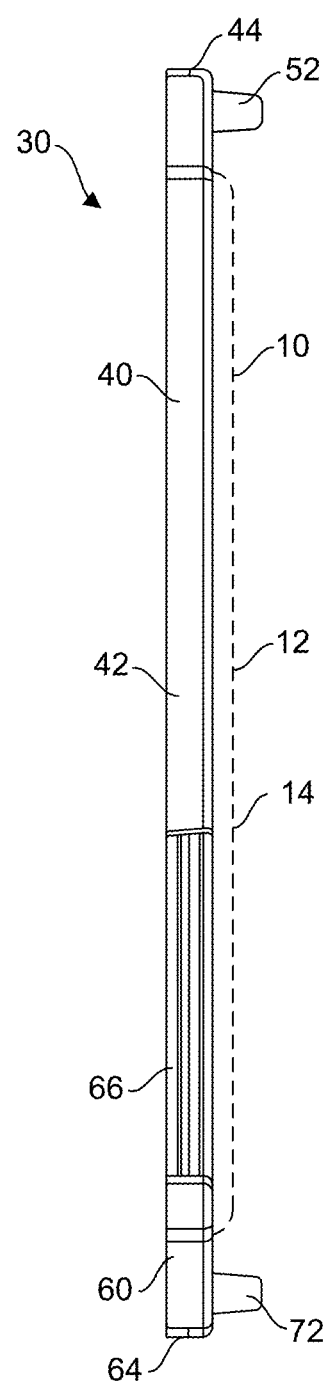
FIG. 4 illustrates a left side view of the electronic device positioned in the tool of FIG. 1.

As illustrated in FIGS. 3 and 4, in some embodiments, each post 52 extends substantially perpendicularly from second side 44. In other embodiments, one or more posts 52 may be angled away from interior 32 as the post 52 extends from second side 44, forming an angle between post 52 and second side 44 of 90°, 95°, 100°, 105° or greater, or within any range defined between any two of the foregoing values, such as 90° to 105°.

As illustrated in FIGS. 3 and 4, in some embodiments one more of posts 52 may have a tapered shape. In some embodiments, the tapered shape of post 52 provides a stopping height for a defined size of alignment apertures 98A or 98B of screen protector assembly 80 (see FIG. 8) to provide for proper vertical alignment of the screen protector assembly 80 onto tool 30. In other words, a screen protector assembly may have apertures of a size which causes them to stop before reaching the bottom of the tapered post.

Referring next to FIGS. 5 and 6, first side 42 illustratively terminates in receiving end 54. Receiving end 54 is configured to receive a portion of second segment 60. In one exemplary embodiment, receiving end 54 includes an opening, channel, or slot 36 configured to slidably receive a portion of third side 66 of second segment 60.

Third side 46 illustratively terminates in received end 56. Received end 56 is configured to be slidably received by a portion of second segment 60. In one exemplary embodiment, received end 56 and at least a portion of third side 46 are received within a portion of first side 62 of second segment 60. In some embodiments, received end 56 includes projections 58. Projections 58 may be formed of a resilient or flexible material and are configured to be pressed together to allow received end 56 to be positioned within first side 62 of second segment 60, and to resiliently expand within first side 62 of second segment 60 to prevent received end 56 from passing past receiving end 74 of first side 62 of second segment 60.

In some exemplary embodiments, first segment 40 is permanently slidably coupled to second segment 60. In some exemplary embodiments, first segment 40 is removably coupled to second segment 60.

Referring again to FIGS. 1-5, second segment 60 includes a first side 62, a second side 64, and a third side 66. First side 62 is illustratively parallel to third side 66 of second segment 60 and first side 42 and third side 46 of first segment 40. Second side 64 is illustratively perpendicular to first side 62 and third side 66 of second segment 60 and first side 42 and third side 46 of first segment 40. As shown in FIG. 2, first side 62 of second segment 60 is configured to be substantially parallel to right side 18 of received electronic device 10. Second side 64 is configured to be substantially parallel to bottom side 22 of received electronic device 10. Third side 66 is configured to be substantially parallel to left side 16 of received electronic device 10.

A first corner alignment feature 68 is formed between first side 62 and second side 64. A second corner alignment FIG. 70 is formed between second side 64 and third side 66. Each corner alignment feature 68, 70 is configured to align received electronic device 10 within the interior 32 of tool 30 to allow proper alignment during installation of the screen protector 82. In some embodiments, each corner alignment feature 68, 70 is a surface at an angle greater than 0° and less than 90° with respect to second side 64, such as the 45° illustrated in FIG. 2. In some embodiments, each corner alignment feature 68, 70 forms an angle with second side 64 as little as 10°, 20°, 30°, 40°, 45°, as great as 50°, 60°, 70°, 80°, or within any range defined between any two of the foregoing values, such as 10° to 80°, 30° to 60°, or 40° to 50°.

Second segment 64 illustratively includes one or more posts 72 configured to receive a screen protector assembly 80 including screen protector 82. As illustrated in FIG. 2, in some embodiments, second side 64 includes two posts 72. In other embodiments, second side 64 includes a single post 72 or three or more posts 72. In some embodiments, including two or more posts 72 may provide for better stability and alignment of screen protector assembly 80 during the installation process. Although illustrated on second side 64, in other embodiments one or more posts 72 may be positioned on first side 62, third side 66, or elsewhere on second segment 60.

As illustrated in FIGS. 3 and 4, in some embodiments each post 72 may have a tapered shape. In some embodiments, the tapered shape of post 72 provides a stopping height for a defined size of alignment apertures 98A or 98B of screen protector assembly 80 (see FIG. 8) to provide for proper vertical alignment of the screen protector assembly 80 onto tool 30. In some embodiments, one or more posts 72 includes a hook or catch on a surface opposite that of interior 32 to assist in positioning alignment apertures 98B of screen protector assembly 80 during the installation process (see FIG. 7).

As illustrated in FIGS. 3 and 4, in some embodiments, each post 72 extends substantially perpendicularly from second side 64. In other embodiments, one or more posts 72 may be angled away from interior 32 as the post 72 extends from second side 64, forming an angle between post 72 and second side 64 of 90°, 95°, 100°, 105° or greater, or within any range defined between any two of the foregoing values, such as 90° to 105°.

Referring next to FIG. 5, first side 62 of second segment 60 illustratively terminates in receiving end 74. Receiving end 74 is configured to receive a portion of first segment 40. In one exemplary embodiment, receiving end 74 includes an opening or slot 36 configured to slidably receive a portion of third side 46 of first segment 40. Slot 36 illustratively includes one or more stops 37 configured to engage projection 78 on the corresponding end 56 of first segment 40.

Third side 66 illustratively terminates in received end 76. Received end 76 is configured to be slidably received by a portion of first segment 40. In one exemplary embodiment, received end 76 and at least a portion of third side 66 are received within a portion of first side 42 of first segment 40. In some embodiments, received end 76 includes projections 78. Projections 78 may be formed of a resilient material and are configured to be pressed together to allow received end 76 to be positioned within first side 42 of first segment 40, and to resiliently expand within first side 42 of first segment 40 to prevent received end 76 from passing past receiving end 54 of first side 42 of first segment 40.

As illustrated in FIGS. 1-5, in some embodiments, at least a portion of first segment 40 is substantially identical to a respective portion of second segment 60. In some embodiments, one or more of first side 42, second side 44, and third side 46 of first segment 40 are substantially identical to the respective first side 62, second side 64, and third side 66 of second segment 60. In some embodiments, one or more of first corner alignment feature 48 and second corner alignment feature 50 of first segment 40 are substantially identical to the respective first corner alignment feature 68 and second corner alignment feature 70 of second segment 60. In some embodiments, the one or more posts 52 of first segment 40 are substantially identical to the respective posts 72 of second segment 60. In some embodiments, one or more of the receiving end 54 and the received end 56 of first segment 40 are substantially identical to the receiving end 74 and received end 76 of second segment 60. In some embodiments, the entire first segment 40 is substantially identical to the second segment 60.

In other embodiments, at least a portion first segment 40 is not substantially identical to a respective portion of second segment 60. In some embodiments, the number, positioning, and/or shape of posts 52 on first segment 40 is different than the number, positioning, and/or shape of posts 72 on second segment 60 to assist in aligning the alignment apertures 98A, 98B of screen protector assembly 80 (see FIG. 8) in the proper orientation. In some embodiments, one or more of first side 42, second side 44, and third side 46 of first segment 40 is not substantially identical to the respective first side 62, second side 64, and third side 66 of second segment 60 to accommodate an electronic device 10 that is non-symmetrical in shape.

In some embodiments, the angled surfaces of the respective alignment features 48, 50, 68, 70 allow for tool 30 to receive electronic devices having a variety of lengths and widths. When the electronic device 10 is received within interior 32 of assembled tool 30 and the first segment 40 is moved or slid towards the second segment 60, each of the corners 24A, 24B, 26A, 26B of electronic device 10 contacts the angled surface of a respective alignment feature 48, 50, 68, 70 of the tool 30. A narrower electronic device 10 will result in each corner 24A, 24B, 26A, 26B contacting the respective angled surface closer to second sides 44, 64, while a wider electronic device 10 will result in corners 24A, 26A, 26B contacting the respective angled surface closer to the respective first sides 42, 62 and corners 24B, 26B contacting the respective angled surface closer to the respective third sides 46, 66. A slight force from sliding first segment 40 towards second segment 60 serves to align by the angled surfaces of alignment features 48, 50, 68, 70 pressing against the respective corners 24A, 24B, 26A, 26B of electronic device 10 to align both a central length axis and a central width axis of the electronic device 10 with a corresponding central length axis and a central width axis of the tool 30.

In some exemplary embodiments, first segment 40 can be uncoupled from second segment 60 by removing received ends 56, 76 from the respective receiving ends 74, 54. First segment 40 can then be coupled to second segment 60 in a second configuration to form a stand for electronic device 10, wherein the first segment 40 is not parallel to the second segment 60 in the stand configuration. In some embodiments, posts 52 support a top side 20 of the electronic device and posts 72 support a bottom side 22 of the electronic device 10 when the tool 30 is in the stand configuration. In some embodiments, first segment 40 forms an angle with second segment 60 in the stand configuration as little as 10°, 20°, 30°, 40°, 45°, as great as 50°, 60°, 70°, 80°, or within any range defined between any two of the foregoing values, such as 10° to 80°, 30° to 60°, or 40° to 50°.

Referring again to FIG. 2, in some embodiments, one or more posts 52 are provided on first segment 40 above a first centerline $CL_A$ of tool 30 and one or more posts 72 are provided on second segment 60 below the first centerline $CL_A$. In some embodiments, one or more posts 52 on first segment 40 are positioned an equal distance from first centerline $CL_A$ as one or more posts 72 on second segment 60. In some embodiments, one or more posts 52 on first segment 40 are provided to a left side of a second centerline $CL_B$ and one or more posts 52 are provided to a right side of second centerline $CL_B$. In some embodiments, posts 52 are provided on first segment 40 an equal distance on either side of second centerline $CL_B$. In some embodiments, one or more posts 72 on second segment 60 are provided to a right side of a second centerline $CL_B$ and one or more posts 72 are provided to a right side of second centerline $CL_B$. In some embodiments, a post 52 is provided on second centerline $CL_B$. In some embodiments, posts 72 are provided on first segment 60 an equal distance on either side of second centerline $CL_B$. In some embodiments, a post 72 is provided on second centerline $CL_B$. In some embodiments, a first post 52 is provided on first segment 40 on a first side of second centerline $CL_B$, a second post 52 is provided on first segment 40 on a second side of second centerline $CL_B$, a first post 52 is provided on first segment 40 on a first side of second centerline $CL_B$, a second post 52 is provided on first segment 40 on a second side of second centerline $CL_B$, above a first centerline $CL_A$ of tool 30 and one or more posts 72 are provided on second segment 60 below the first centerline $CL_A$. In some embodiments, one or more posts 52 on first segment 40 are positioned an equal distance from first centerline $CL_A$ as one or more posts 72 on second segment 60. In some embodiments, a first post 52 is provided on first segment 40 on a first side of second centerline $CL_B$, a second post 52 is provided on first segment 40 on a second side of second centerline $CL_B$, a first post 72 is provided on second segment 60 on the first side of second centerline $CL_B$, and a second post 72 is provided on second segment 60 on the second side of second centerline $CL_B$. In some embodiments, a first post 52 is provided on first segment 40 on a first side of second centerline $CL_B$, a second post 52 is provided on first segment 40 on a second side of second centerline $CL_B$, and a post 72 is provided on second segment 60 on second centerline $CL_B$.

In some embodiments, the stand configuration is formed by inserting a portion of received end 56, such as projections 58, into a first receiving slot 34 positioned on first side 62 of second segment 60 and a portion of received end 76, such as projections 78, into a first receiving slot 34 positioned on first side 72 of second segment 60 (see FIGS. 4-5). In some embodiments, the stand configuration is formed by inserting a portion of received end 56, such as projections 58, into a second receiving slot 36 positioned on first side 62 of second segment 60 proximate receiving end 74 and a portion of received end 76, such as projections 78, into a second receiving slot 34 positioned on first side 72 of second segment 60 proximate receiving end 54 (see FIGS. 4-5).

Figure 8:
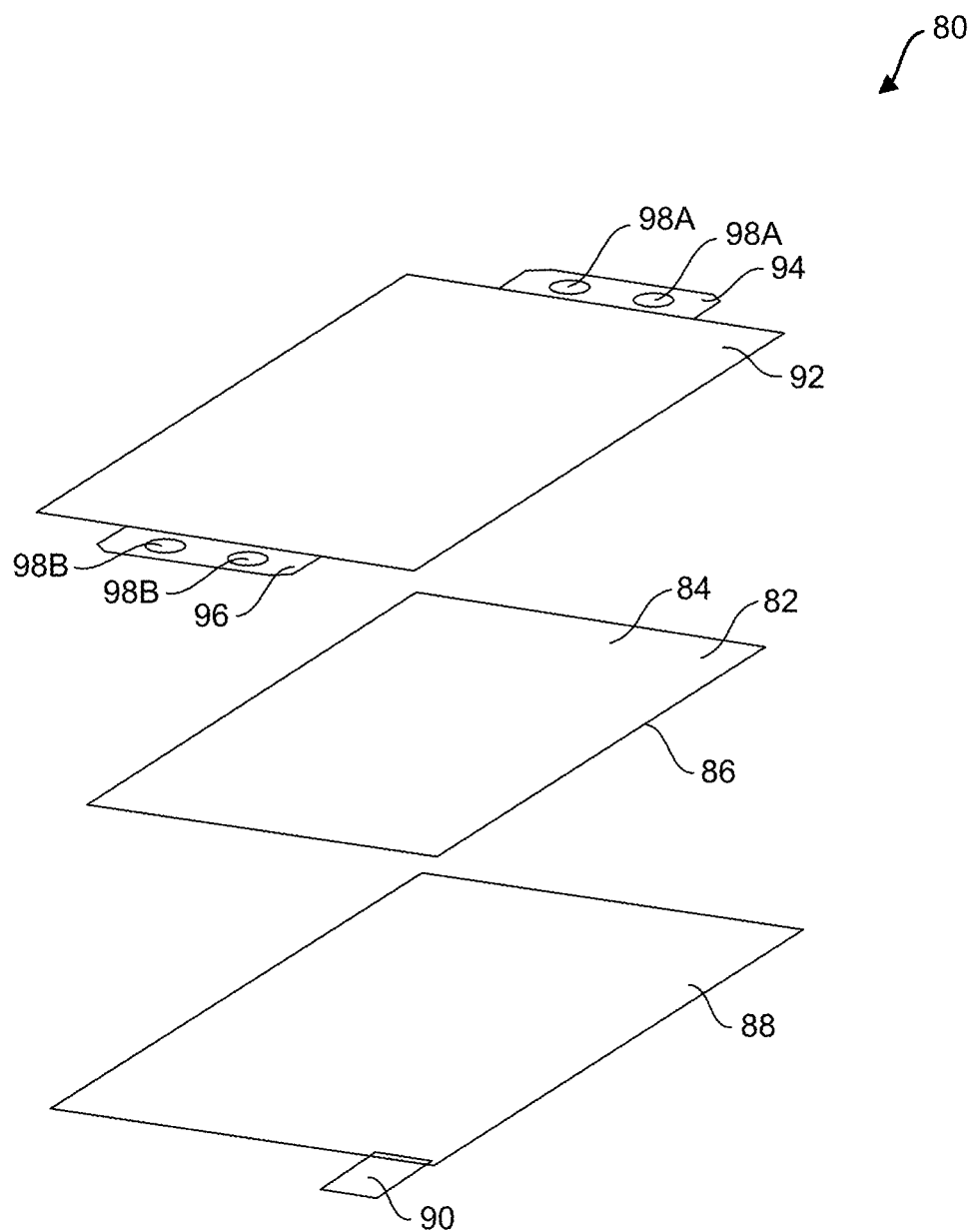
FIG. 8 illustrates an exploded view of the screen protector assembly of FIG. 7.
Figure 9:
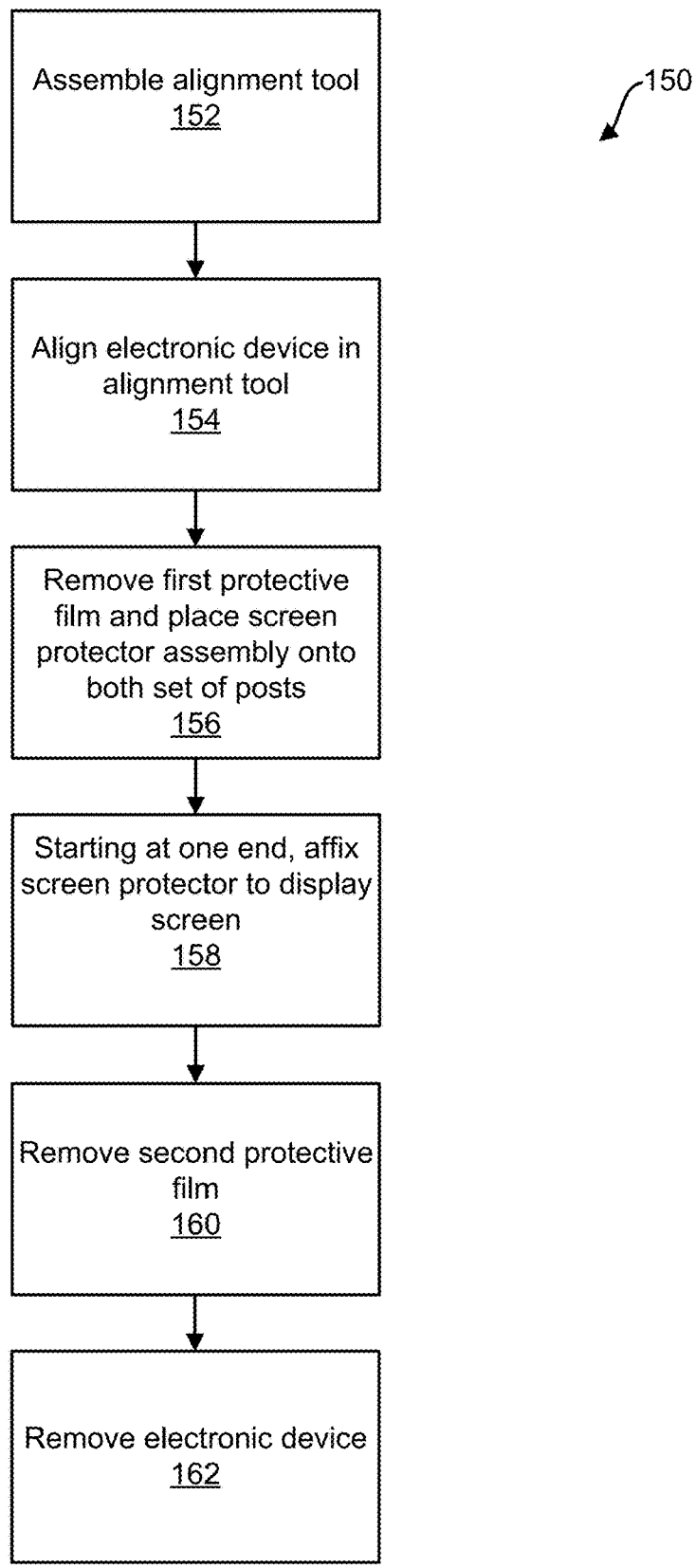
FIG. 9 is a flow chart illustrating an exemplary method of installing a screen protector using the screen protector assembly of FIG. 7 and tool of FIG. 1.

Referring next to FIGS. 8 and 9, an exemplary screen protector assembly 80 for use with tool 30 is illustrated. Screen protector assembly 80 includes a screen protector 82 to be affixed to the display screen 14 of electronic device 10 using tool 30. In some exemplary embodiments, screen protector 82 is formed from a glass material, such as soda lime glass or fortified glass. In some exemplary embodiments, screen protector 82 is formed from a polymeric material, such as a plastic film or composite.

Screen protector 82 includes a front surface 84 and an opposing rear surface 86. In some embodiments, at least a portion of rear surface 86 is coated with a suitable adhesive for affixing screen protector 82 to electronic device 10. In some embodiments, only a perimeter portion of the rear surface 86 is coated with the adhesive. In some embodiments, the entire rear surface 86 is coated with the adhesive.

In some exemplary embodiments, screen protector 82 is a substantially flat geometry configured to cover only a front surface 12 of electronic device. In some exemplary embodiments, screen protector 82 includes one or more curved surfaces configured to at least partially cover a portion of one or more side surfaces, such as left side 16 or right side 18 of electronic device 10, and/or one or more curved edges of electronic device 10.

Screen protector 82 includes a front surface 84 and an opposing rear surface 86. Rear surface 86 of screen protector 82 is illustratively protected by a first removable film 88. Removable film 88 illustratively includes a gripping tab 90 at one end to assist in the removal of removable film 88 from the screen protector 82. Gripping tab 90 may be formed as part of removable film 88 or may be a separate component which is attached to removable film 88.

Front surface 84 of screen protector 82 is illustratively protected by a second removable film 92. Second removable film 92 illustratively includes a first alignment extension 94 at a first end of removable film 92 configured to align towards a top side 20 of electronic device 10 and a second alignment 96 at a second end of removable film 92 configured to align towards a bottom side 22 of electronic device 10. First alignment extension 94 includes one or more alignment apertures 98A configured to be received on posts 52 on first segment 40 of tool 30. Second alignment extension 96 includes one or more alignment apertures 98B configured to be received on posts 72 on second segment 60 of tool 30. In some embodiments, alignment apertures 98A are the same size and in the respective same position on first alignment extension 94 as alignment apertures 98B on second alignment extension 96. In some embodiments, alignment apertures 98A differ in size and/or respective position on first alignment extension 94 compared to alignment apertures 98B on second alignment extension 96.

Next, the screen protector assembly 80 (see FIGS. 7-8) and alignment tool 30 (see FIGS. 1-6) will be further discussed with reference to an exemplary method 150, shown in FIG. 9, of installing the screen protector 82 onto an electronic device 10 received within the interior 32 of alignment tool 30.

In step 152, the alignment tool 30 is assembled by compressing the projections 58 and placing the received end 56 of first segment 40 into the corresponding receiving end 74 of second segment 60 and compressing the projections 78 and placing the received end 76 of second segment 60 into the corresponding receiving end 54 of first segment 40. Once the projections 58, 78 are received within the corresponding receiving ends 74, 54, they are able to resiliently flex back outward. The third side 46 of the first segment 40 has a smaller perimeter than the first side 62 of the second segment 60 and the third side 66 of the second segment 60 has a smaller perimeter than the first side 42 of the first segment 40. This allows the third leg 46 of the first segment 40 to slide within the first leg 62 of the second segment 60 and the third leg 66 of the second segment 60 to slide within the first leg 42 of the first segment to achieve different lengths for the interior 32 of tool 30.

In step 154, the electronic device 10 is placed within the interior 32 of tool 30 with the display screen 14 facing upward. The electronic device 10 is aligned within the interior 32 of the tool by pressing the second side 44 of the first segment 40 towards the second side 64 of the second segment 60. The first top corner 24A of the electronic device 10 is contacted by the first corner alignment feature 48 of the first segment 40 and the second top corner 24B of the electronic device 10 is contacted by the second corner alignment feature 50 of the first segment 40. The first bottom corner 26A of the electronic device 10 is contacted by the first corner alignment feature 68 of the second segment 60 and the second bottom corner 26B of the electronic device 10 is contacted by the second corner alignment feature 70 of the second segment 60. The angled surfaces of corner alignment features 48, 50, 68, 70 align and center the electronic device 10 as the corresponding second sides 44, 64 of the first segment 40 and second segment 60 are brought, slid, or moved towards each other.

In step 156, the rear surface 86 of screen protector 82 is exposed by pulling the first protective film 88 off using the grasping tab 90. The alignment apertures 98A on first alignment extension 94 at a first end of screen protector assembly 80 are placed over the posts 52 of the first segment 40 of tool 30. The alignment apertures 98B on second alignment extension 96 at a second opposing end of screen protector assembly 80 are placed over the posts 72 of the second segment 60 of tool 30. In some embodiments, alignment apertures 98A are substantially identical in size, shape, and/or relative position on first alignment extension 94 to the size shape, and/or relative position or alignment apertures 98B on second alignment extension 96, which may be advantageous where the screen protector assembly 80 does not have a preferred orientation relative to the electronic device 10. In other embodiments, alignment apertures 98A are not substantially identical in one or more of the size, shape, and/or relative position on first alignment extension 94 to the size shape, and/or relative position or alignment apertures 98B on second alignment extension 96, which may be advantageous where the screen protector assembly 80 does have a required orientation relative to the electronic device 10.

In some embodiments, a size of the alignment apertures 98A, 98B is selected to prevent the screen protector assembly 80 from traveling down the taper of the posts 52 beyond a predetermined point to provide a height alignment of the screen protector 82 and display screen 14 of the electronic device 10 during assembly (see FIGS. 3-4). In some embodiments, a distance between the alignment apertures 98A, 98B and the screen protector 82 is selected to provide a length alignment of the screen protector 82 and display screen 14 of the electronic device 10 during assembly (see FIG. 2).

In step 158, the screen protector is gently pressed against the display screen 14 of the electronic device 10, affixing the adhesive of the rear side 86 of the screen protector to the electronic device 10. In some embodiments, a gentle wave or rolling motion is used to affix the screen protector 82 to the electronic device starting from one end and moving toward the other end. In some embodiments, a squeegee or other installation tool may be used to help press the screen protector 82 against the electronic device 10. In some embodiments, it may be necessary to remove any trapped air bubbles by gently pressing against the affixed screen protector 82.

In step 160, the second protective film 92 is removed from screen protector 82 by grasping one of the alignment extensions 94, 96, and pulling the film 92 off of the top surface 84 of the screen protector. The adhesive holding screen protector 82 to electronic device 10 is stronger than the adhesive holding film 92 to screen protector 82.

In step 162, the electronic device 10 and affixed screen protector 82 are removed from the tool 30.

Figure 10:
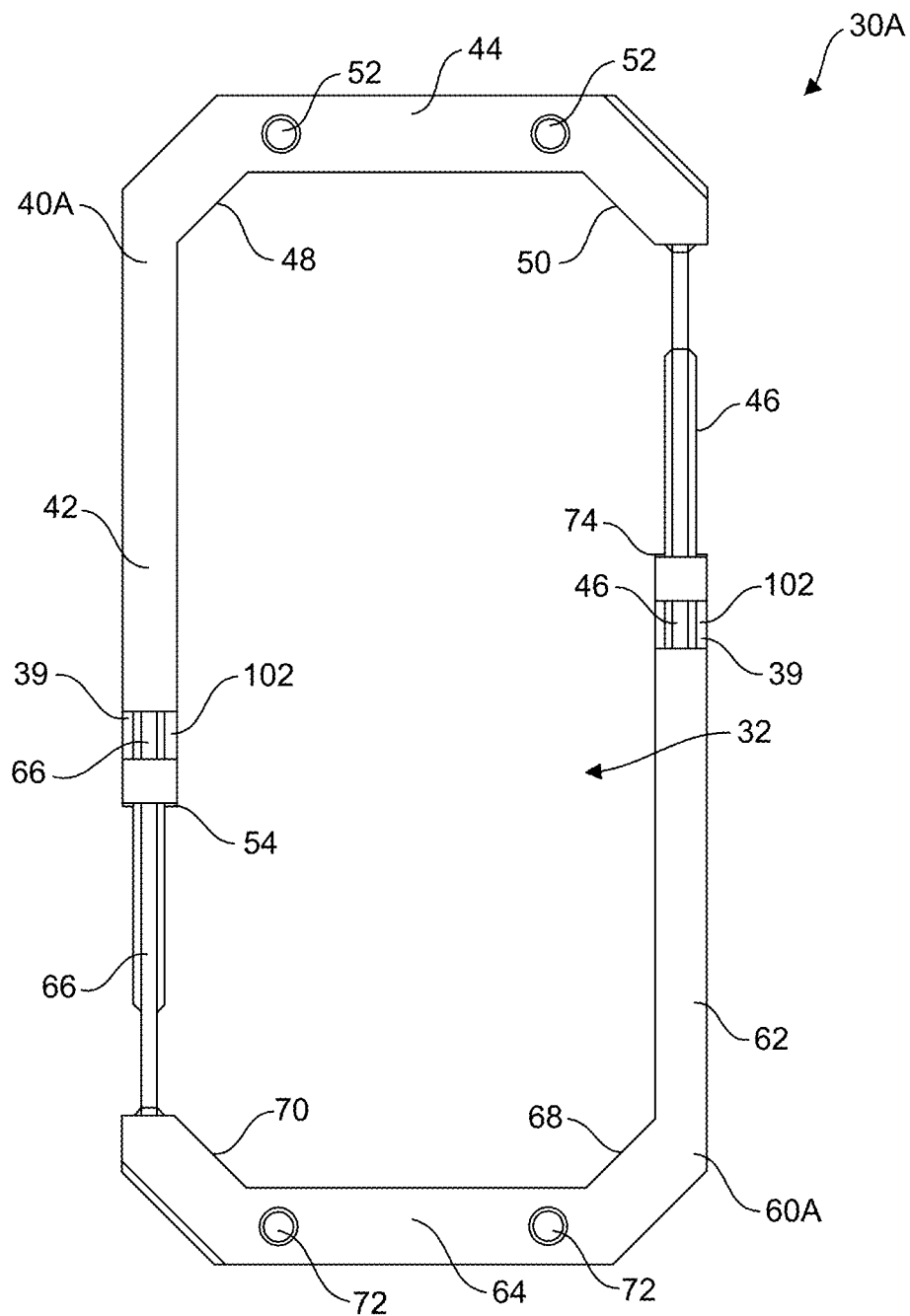
FIG. 10 illustrates a front view of another exemplary tool for installing a screen protector on an electronic device.
Figure 11:
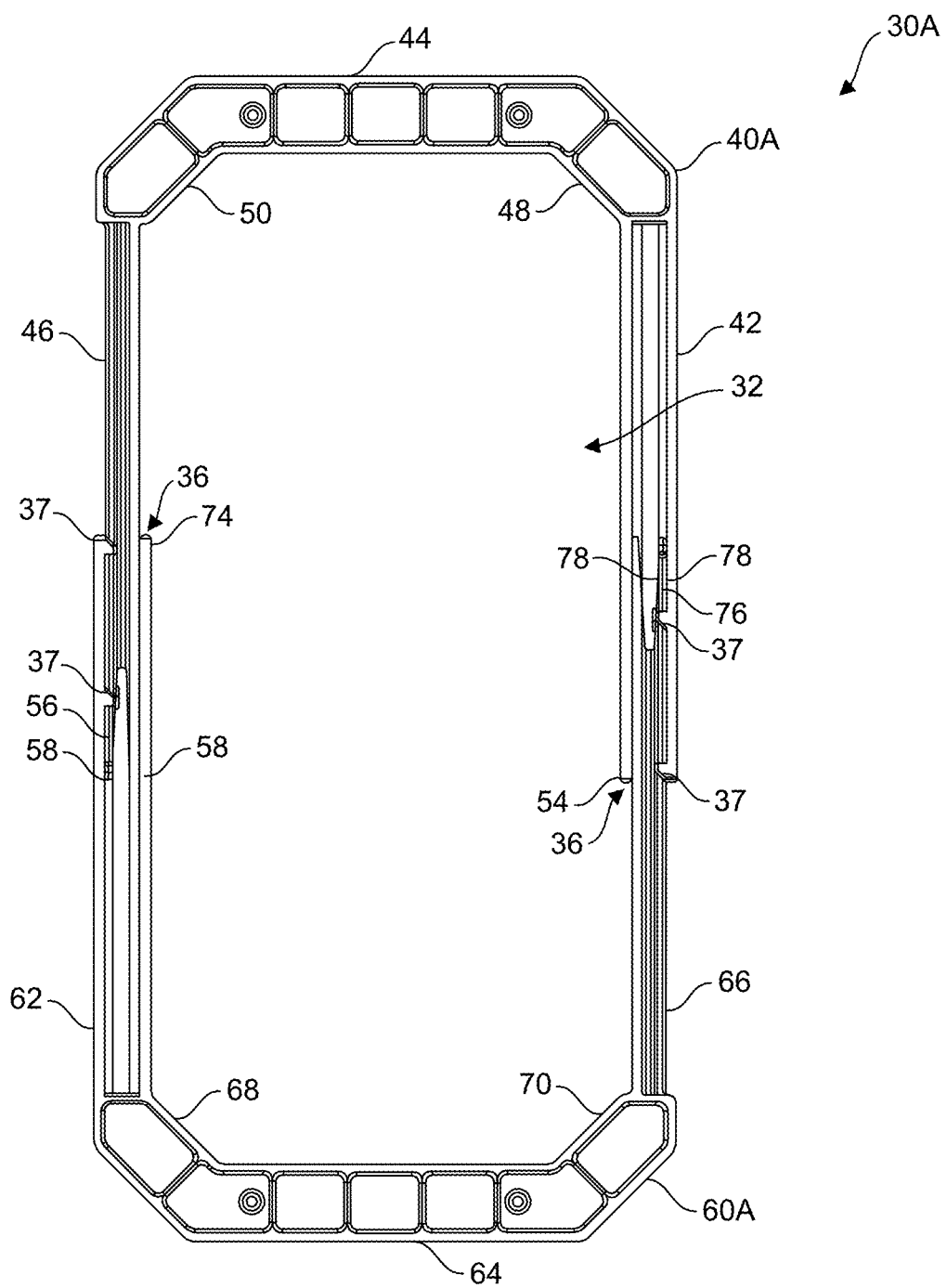
FIG. 11 illustrates a rear view of the tool of FIG. 10.
Figure 12:
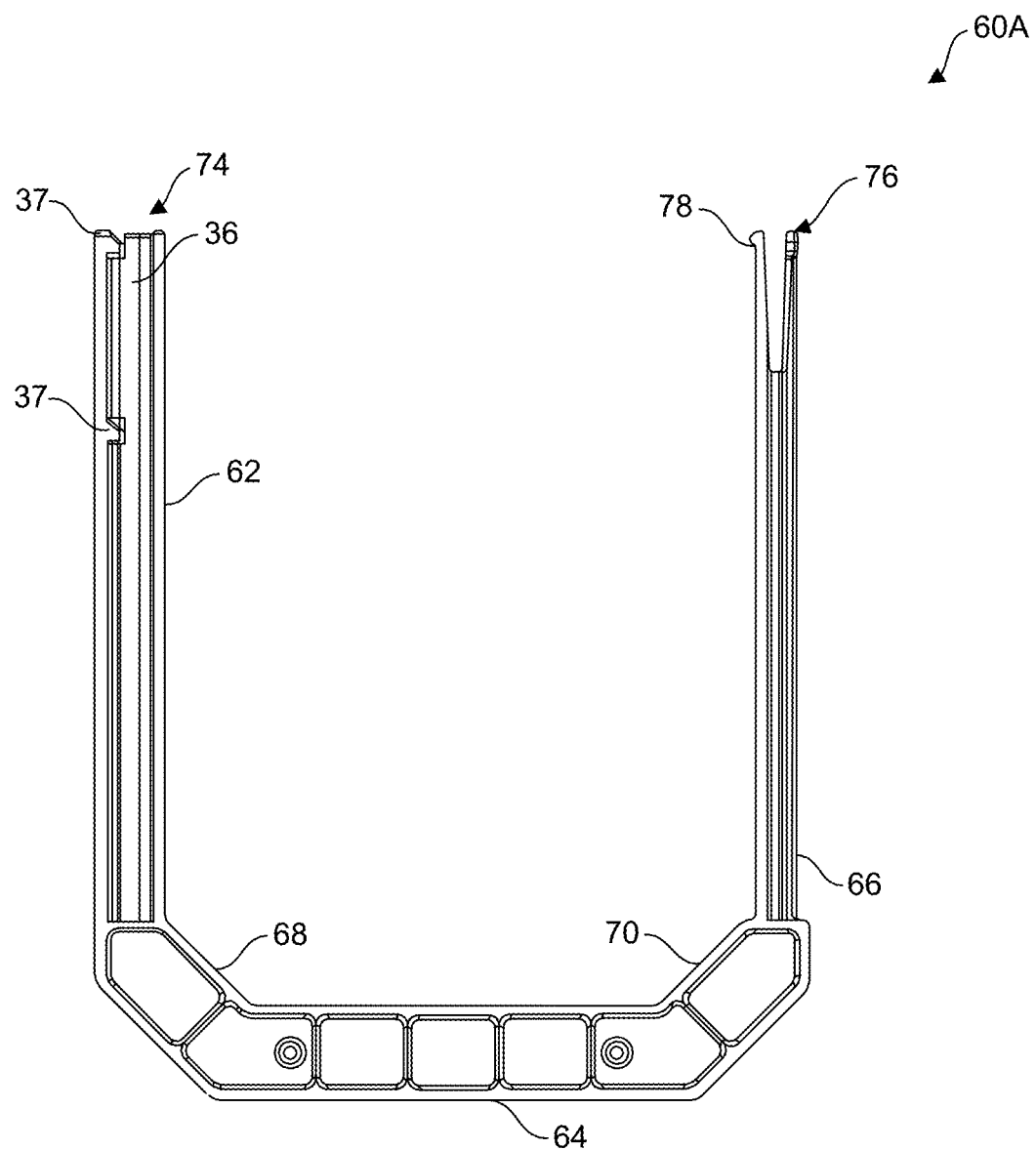
FIG. 12 illustrates a rear view of a segment of the tool of FIG. 10.

Referring next to FIGS. 10-12, another exemplary tool 30A for aligning and installing a screen protector 82 (see FIGS. 7-8) onto an electronic device 10 (see FIGS. 2-4) is illustrated. In some embodiments, tool 30A includes components or features similar to those described above with respect to tool 30, and similar part numbers are used to indicate similar components in FIGS. 11 and 12.

Tool 30A illustratively includes a first segment 40A having a first side 42, a second side 44, and a third side 46 and a second segment 60A having a first side 62, a second side 64, and a third side 66. First segment 40A is slideably moveable relative to second segment 60A to define an interior 32 configured to accommodate a range of sizes of electronic device 10. In some exemplary embodiments, at least a portion of first segment 40A is substantially identical to a respective portion of second segment 60A. In some embodiments, the entire first segment 40A is substantially identical to the second segment 60A. In other embodiments, at least a portion first segment 40A is not substantially identical to a respective portion of second segment 60A.

First side 42 of first segment 40A and first side 62 of second segment 60A each illustratively terminate in a respective receiving end 54, 74 each including a slot 36. The slot 36 of receiving end 54 is configured to receive a portion of third side 66 of second segment 60A and the slot 36 for receiving end 74 is configured to receive a portion of third side 46 of first segment 40A.

Third side 46 of first segment 40A and third side 62 of second segment 60A each illustratively terminate in a respective received end 56, 76. Received end 56 includes a pair of projections 58 and received end 76 includes a pair of projections 78. Projections 58, 78 may be formed of a flexible or resilient material and are configured to be pressed together to allow the respective received end 56 slide into the corresponding receiving end 54, 74 past one or more stops 37. First side 42 of first segment 40A and first side 62 of second segment 60A each include a window 39 through which the respective received end 56, 76 is visible. A user can press together the projections 58, 78 of respective received end 56, 76 through the window 39 to pass beyond stops 37 and remove the received end 56, 76 from corresponding receiving end 54, 74.

Figure 13:
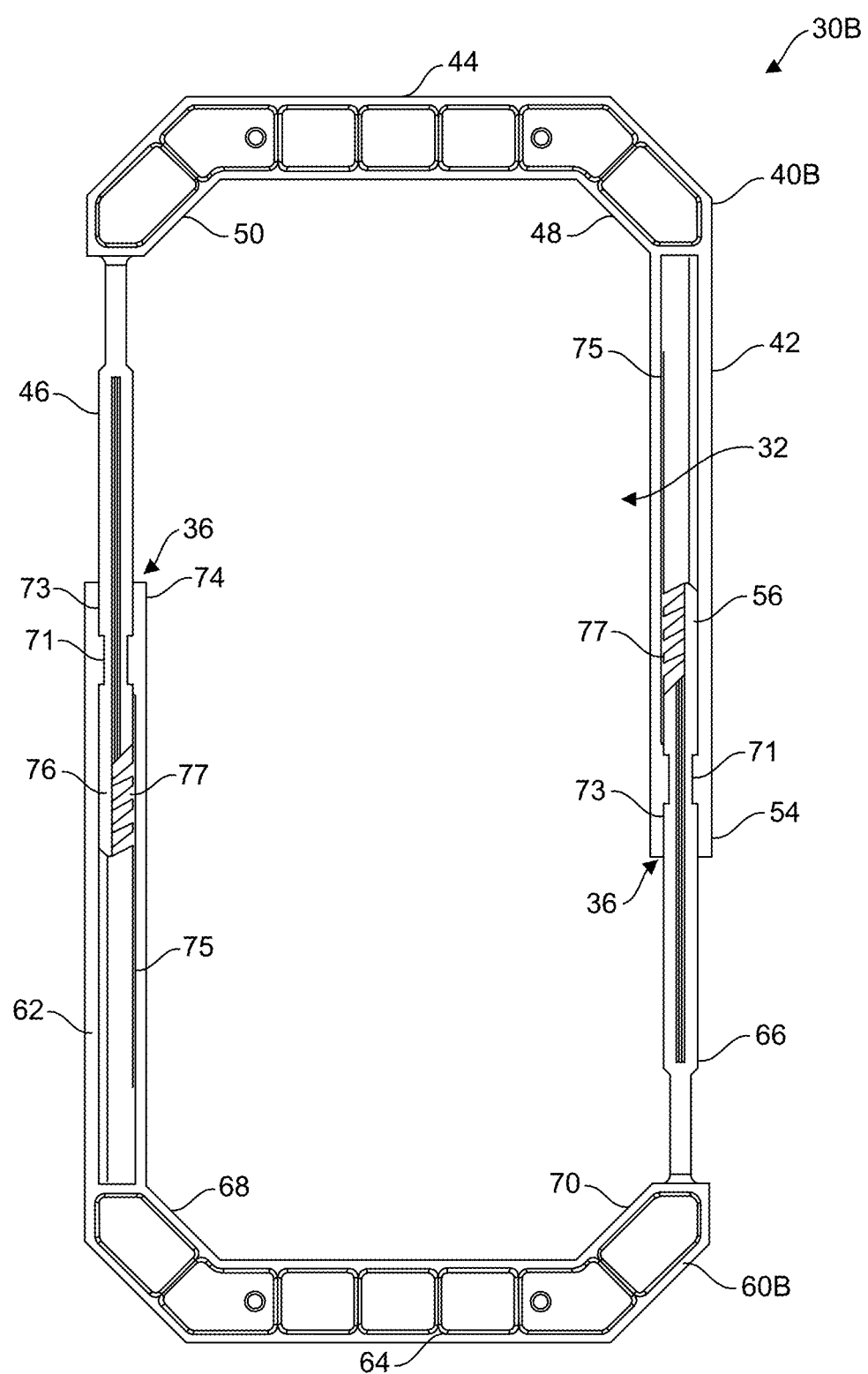
FIG. 13 illustrates a rear view of another exemplary tool for installing a screen protector on an electronic device.
Figure 14:
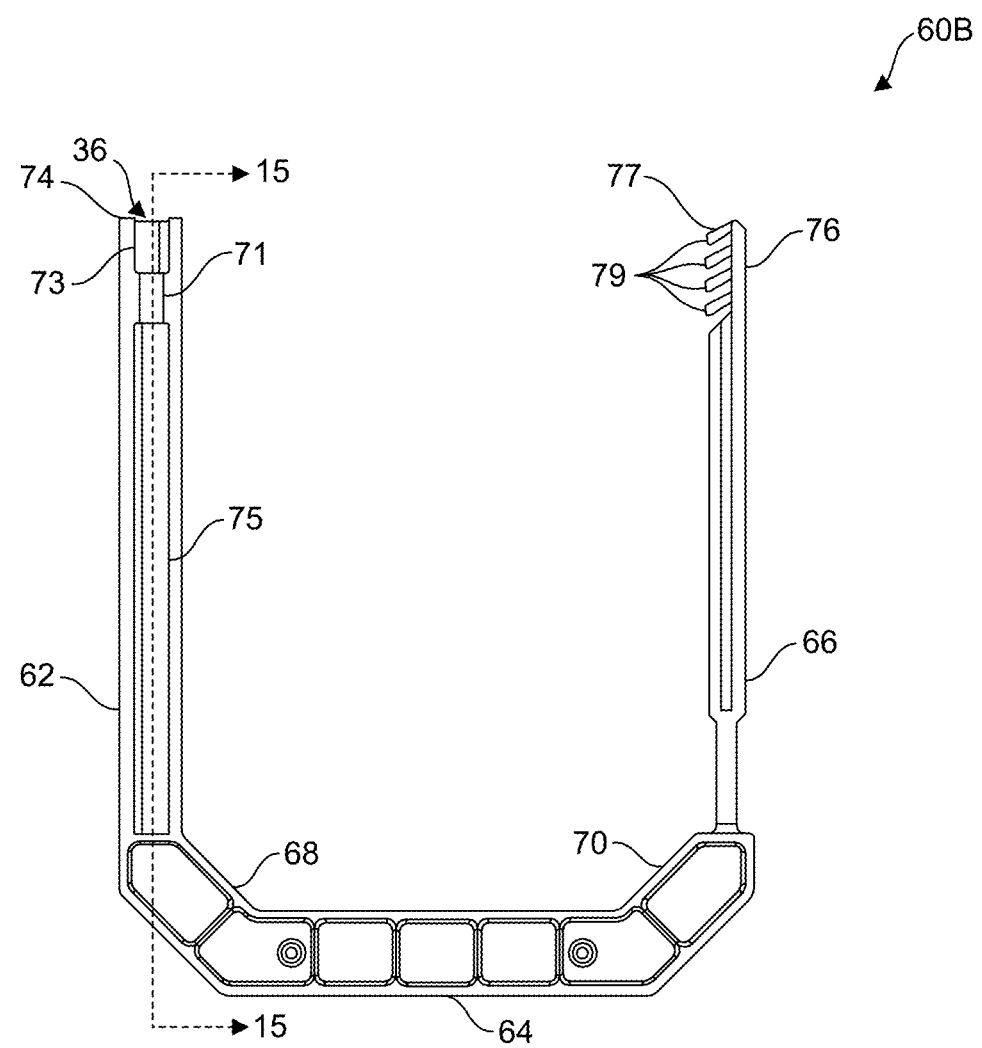
FIG. 14 illustrates a rear view of a segment of the tool of FIG. 13.
Figure 15:
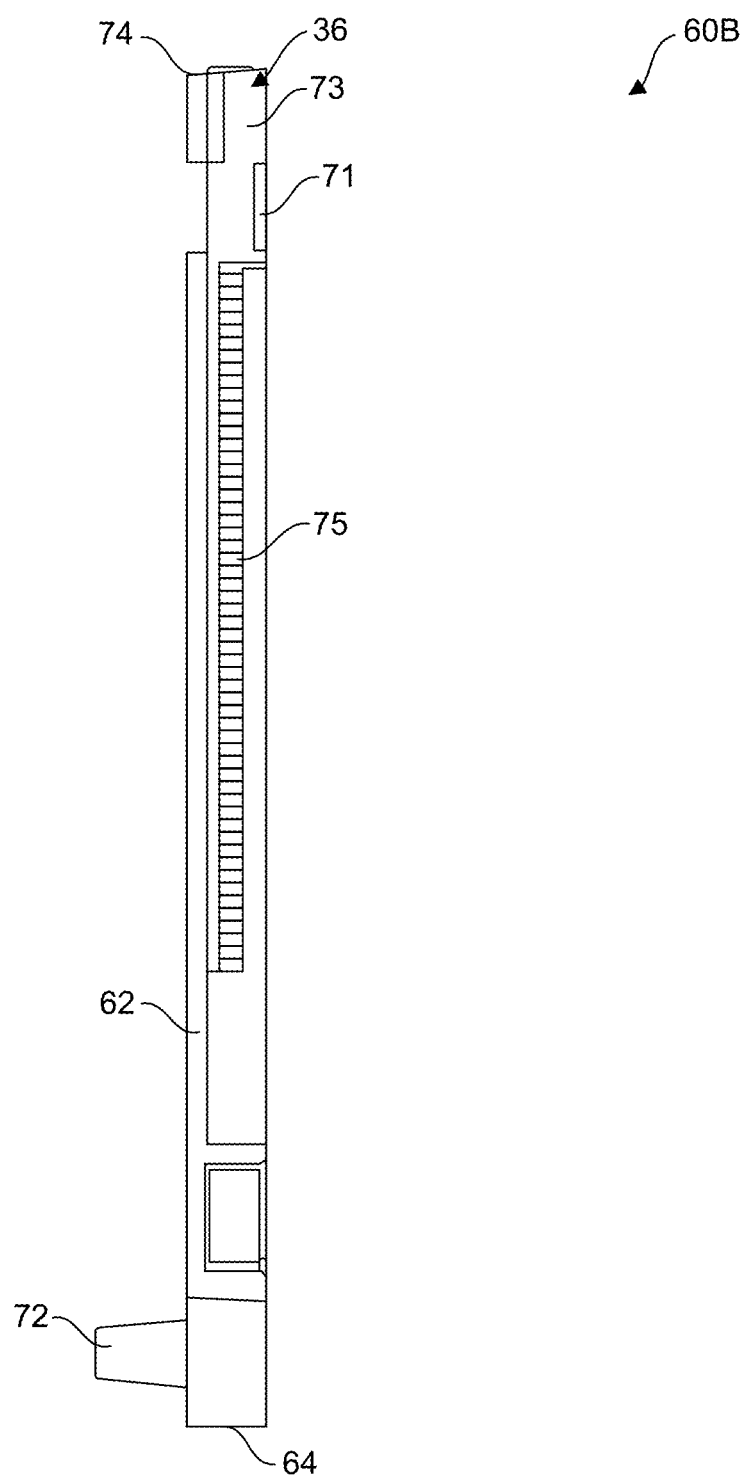
FIG. 15 illustrates a sectional view of the segment of FIG. 14 along the line labeled 15-15 in FIG. 14.

Referring next to FIGS. 13-15, still another exemplary tool 30B for aligning and installing a screen protector 82 (see FIGS. 7-8) onto an electronic device 10 (see FIGS. 2-4) is illustrated. In some embodiments, tool 30B includes components or features similar to those described above with respect to tool 30 and/or tool 30A, and similar part numbers are used to indicate similar components in FIGS. 13-15.

Tool 30B illustratively includes a first segment 40B having a first side 42, a second side 44, and a third side 46 and a second segment 60B having a first side 62, a second side 64, and a third side 66. First segment 40B is slideably moveable relative to second segment 60B to define an interior 32 configured to accommodate a range of sizes of electronic device 10. In some exemplary embodiments, at least a portion of first segment 40B is substantially identical to a respective portion of second segment 60B. In some embodiments, the entire first segment 40B is substantially identical to the second segment 60B. In other embodiments, at least a portion first segment 40B is not substantially identical to a respective portion of second segment 60B.

First side 42 of first segment 40B and first side 62 of second segment 60B each illustratively terminate in a respective receiving end 54, 74 each including a slot 36. Slot 36 illustratively is open to the bottom of first segment 40B and second segment 60B. The slot 36 of receiving end 54 is configured to receive a portion of third side 66 of second segment 60B and the slot 36 for receiving end 74 is configured to receive a portion of third side 46 of first segment 40B. Each receiving end 54, 74, illustratively includes a plurality of teeth 75 positioned along an interior wall of slot 36.

Third side 46 of first segment 40B and third side 62 of second segment 60B each illustratively terminate in a respective received end 56, 76. Received end 56 and received end 76 each include ratcheting teeth 77. Ratcheting teeth 77 are illustratively formed of a resilient material allowing ratcheting teeth to flex in a direction towards the respective third side 46, 66, allowing first segment 40B and second segment 60B to move relative each other to decrease the size of interior 32. Ratcheting teeth 77 terminate in tooth end 79. Each tooth end 79 is configured to engage a corresponding tooth of plurality of teeth 75 positioned along the interior wall of slot 36 in either first side 42 of first segment 40B or first side 62 of second segment 60B. The engagement of tooth end 79 with the tooth of plurality of teeth 75 prevents first segment 40B from moving relative to second segment 60B in a direction to increase the size of interior 32.

Each slot 36 further includes a neck 71 and wider portion 73. As first segment 40B is moved relative to second segment 60B to decrease the size of interior 32, the ratcheting teeth 77 are flexed towards their respective third side 46, 66, disengaging from the corresponding teeth 75 positioned along the interior wall of slot 36 in either first side 42 of first segment 40B or first side 62 of second segment 60B. Further movement of first segment 40B with respect to second segment 60 results in the ratcheting teeth 77 flexing back away from their respective third side 46, 66 into wider portion 73, allowing the respective third sides 46, 66 to be removed through the open bottom of the respective slots 36 in either first segment 40B or second segment 60B.

Ratcheting teeth 77 and the corresponding teeth 75 are configured to allow the first segment 40B to slide with respect to the second segment 60B in a first direction, such as to diminish or reduce a dimension of interior 32, but to resist the first segment 40B sliding with respect to the second segment 60B in a second direction opposite the first direction, such as to enlarge a dimension of interior 32.

Figure 16:
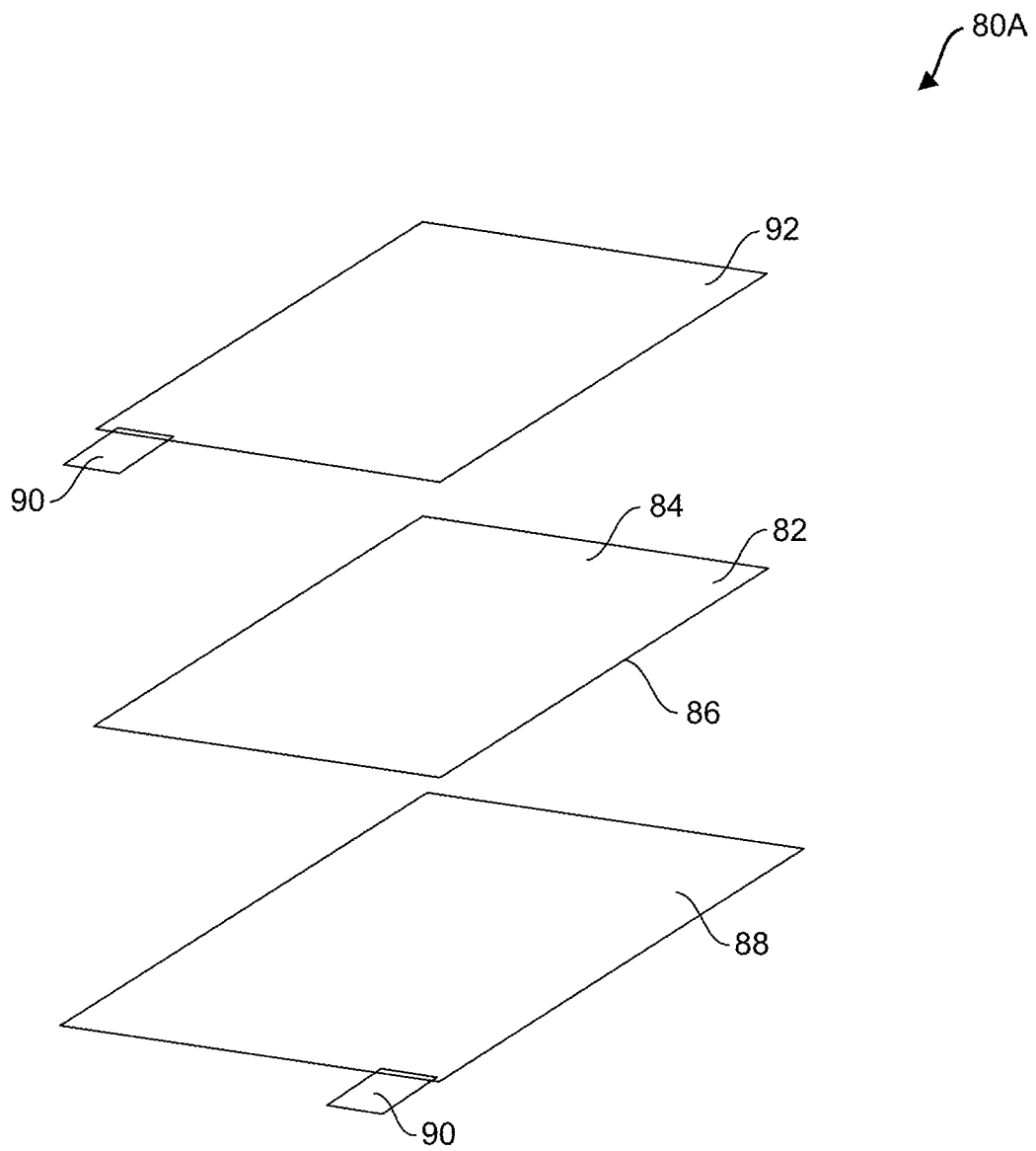
FIG. 16 illustrates another exemplary screen protector assembly.

Referring next to FIG. 16, another exemplary screen protector assembly 80A is illustrated. In some embodiments, screen protector assembly 80A includes components or features similar to those described above with respect to screen protector assembly 80 illustrated in FIGS. 7 and 8, and similar part numbers are used to indicate similar components in FIG. 16.

Screen protector assembly 80A includes a glass or polymeric screen protector 82 to be affixed to the display screen 14 of electronic device 10. Screen protector 82 includes a front surface 84 and an opposing rear surface 86, at least a portion of rear surface 86 being coated with a suitable adhesive for affixing screen protector 82 to electronic device 10. The adhesive of rear surface 86 is illustratively protected by a first removable film 88. Front surface 84 of screen protector 82 is illustratively protected by a second removable film 92. In some embodiments, first removable film 88 and/or second removable film 92 includes a gripping tab 90 at one end to assist in the removal of the respective removable film 88, 92.

Figure 17:
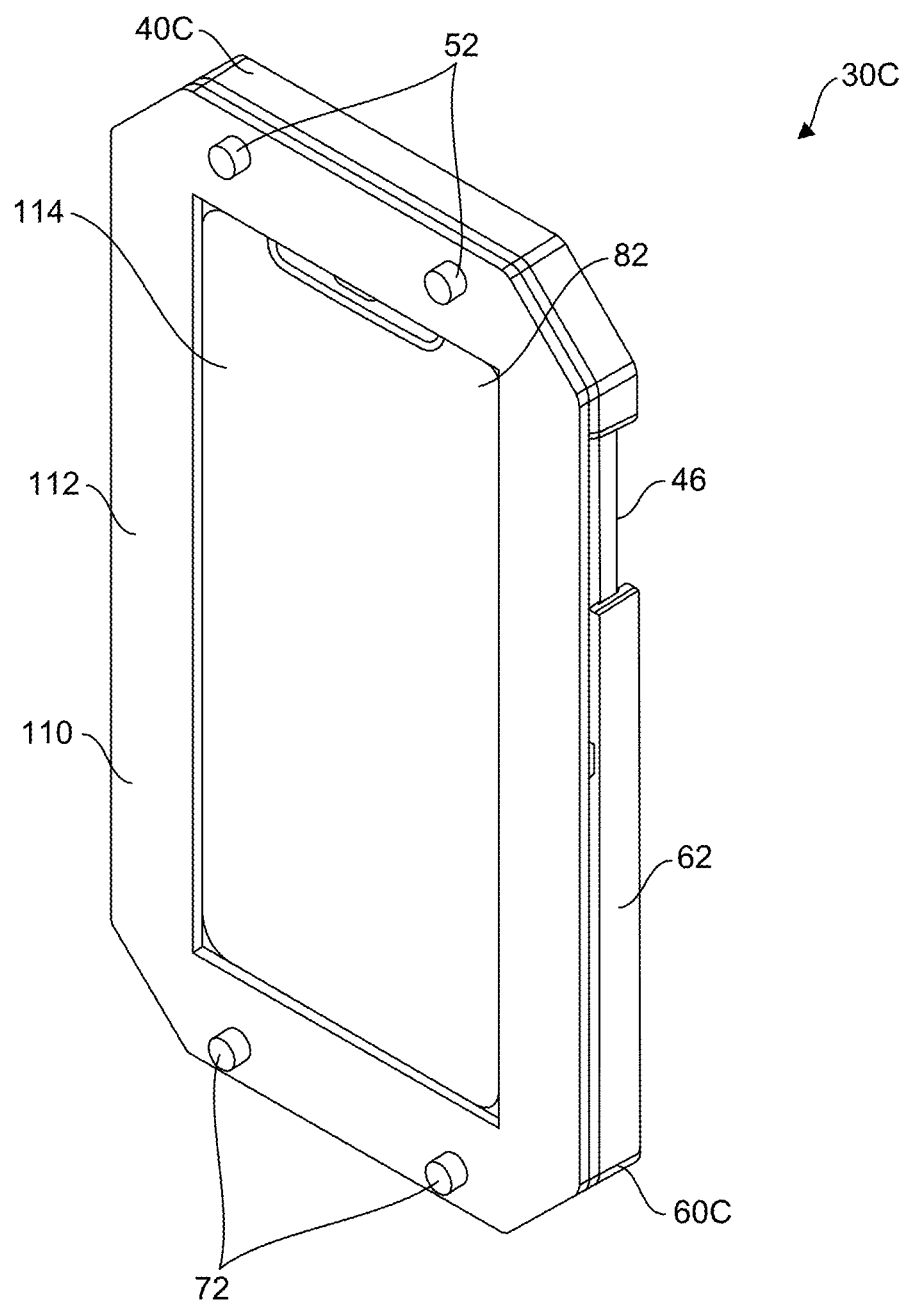
FIG. 17 illustrates a perspective view of another exemplary tool for installing a screen protector on an electronic device.
Figure 18:
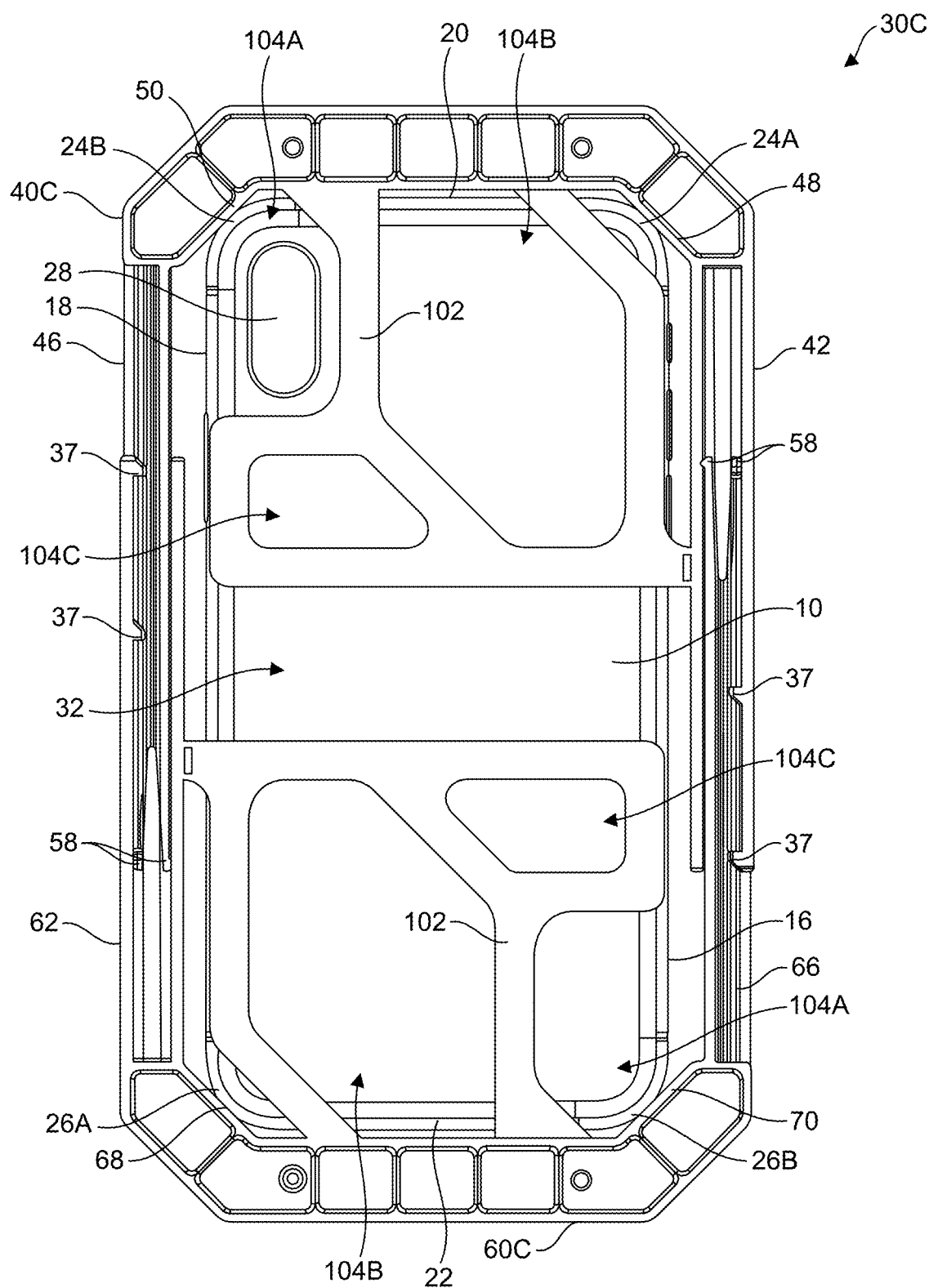
FIG. 18 illustrates a rear view of the tool of FIG. 17.
Figure 19:
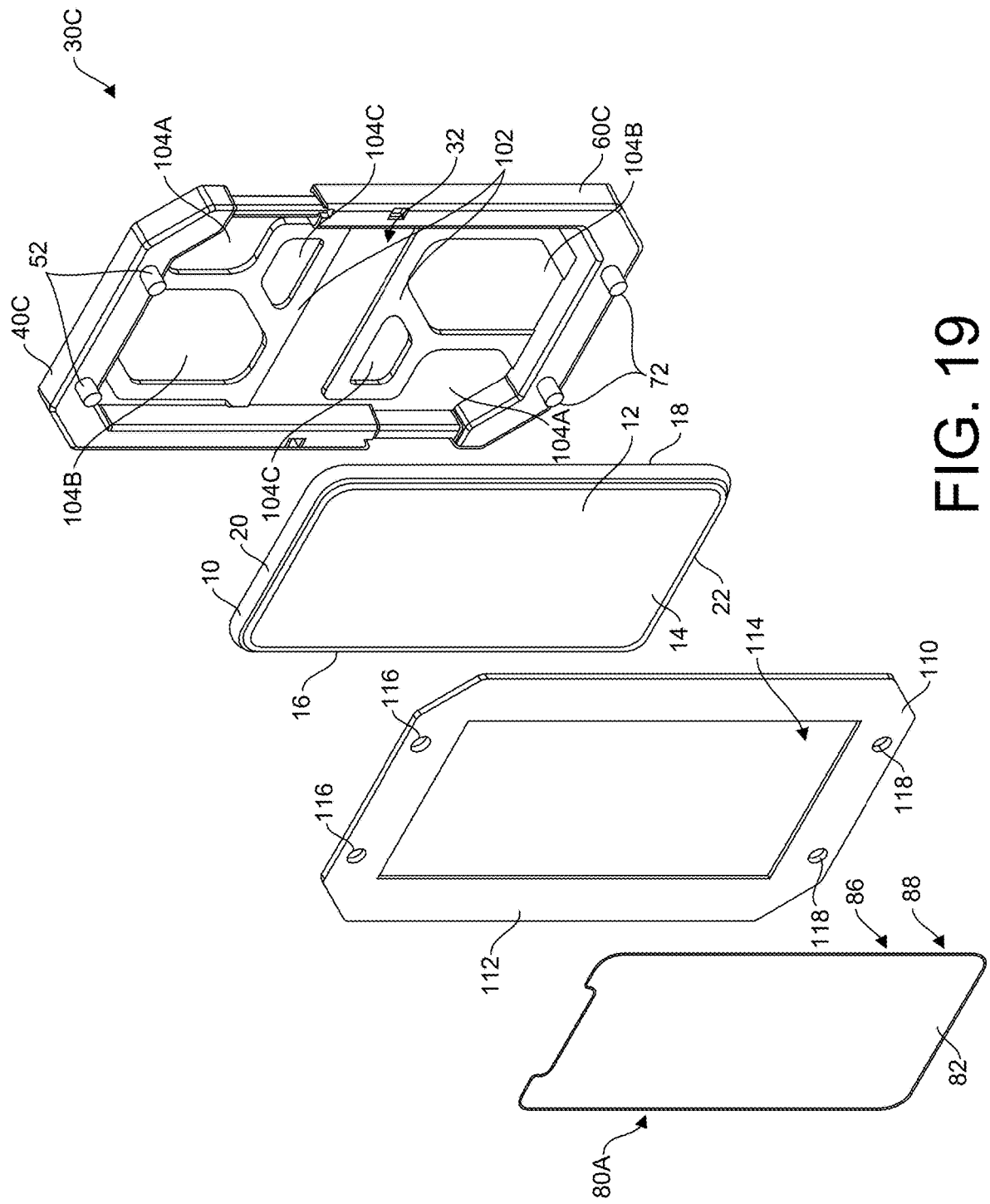
FIG. 19 illustrates a first exemplary exploded view of the tool of FIG. 17.

Referring next to FIGS. 17-19, an exemplary tool 30C for aligning and installing a screen protector 82 (see FIG. 16) onto an electronic device 10 is illustrated. In some embodiments, tool 30C includes components or features similar to those described above with respect to tool 30, tool 30A, and/or tool 30B, and similar part numbers are used to indicate similar components in FIGS. 17-19.

Tool 30C illustratively includes a first segment 40C having a first side 42, a second side 44, and a third side 46 and a second segment 60C having a first side 62, a second side 64, and a third side 66. First segment 40C is slideably moveable relative to second segment 60C to define an interior 32 configured to accommodate a range of sizes of electronic device 10. In some exemplary embodiments, at least a portion of first segment 40C is substantially identical to a respective portion of second segment 60C. In some embodiments, the entire first segment 40C is substantially identical to the second segment 60C. In other embodiments, at least a portion first segment 40C is not substantially identical to a respective portion of second segment 60C.

In some embodiments, electronic device 10 includes one or more features 28 extending from a back surface of electronic device 10. Exemplary features 28 that may extend from the back surface of electronic device 10 include, but are not limited to, one or more cameras, a fingerprint scanner or other biometric scanner, and a user input device. Feature 28 extends outwardly from the back surface of electronic device 10, making it difficult for electronic device 10 to lay flat within interior 32 of tool 30C for properly alignment of screen protector assembly 80A during installation of screen protector 82.

To assist in laying electronic device 10 flat within interior 32 of tool 30C, in some embodiments, first segment 40C and/or second segment 60C includes one or more extensions 102 extending from one or more of respective first sides 42, 62, second sides 44, 64, and/or third sides 46, 66. Extensions 102 support the back surface of electronic device 10 in an area other than the area of feature 28 to allow electronic device 10 to lay flat within interior 32 of tool 30C. As illustrated in FIG. 18A, in some embodiments, extensions 102 form one or more openings 104A, 104B, 104C for receiving feature 28 extending from back surface of electronic device 10. In other embodiments, extensions 102 do not form any openings 104.

As illustrated in FIG. 18, in some embodiments, first segment 40C and second segment 60C include identically shaped extensions 102 forming identically shaped openings 104. In other embodiments, first segment 40C and second segment 60C include one or more differently shaped extensions 102 forming differently shaped openings 104. In still other embodiments, first segment 40C and/or second segment 60C may not include any extensions 102 or any extensions 102 may not form any openings 104.

In some embodiments, extensions 102 can be broken off of or otherwise removed from first segment 40C and/or second segment 60C prior to placing electronic device 10 into the interior 32 of tool 30C.

As illustrated in FIGS. 17 and 19, tool 30C further includes core 110. Core 110 is illustratively formed from a semi-rigid material to prevent core 110 from stretching once it is received on posts 52 of first segment 40C and posts 72 of second segment 60C. Exemplary semi-rigid materials include foam, thermoplastic, cardboard, and paperboard. In some exemplary embodiments, core 110 is formed from a die-cut or laser-cut piece of material.

Core 110 includes a perimeter portion 112 surrounding an aperture 114. Aperture 114 is sized to receive screen protector 82. A first end of perimeter portion 112 includes one or more alignment apertures 116 configured to be received on corresponding posts 52 of first segment 40C. A second end of perimeter portion 112 includes one or more alignment apertures 118 configured to be received on corresponding posts 72 of second segment 60C.

In some embodiments, core 110 secures tool 30C in a predetermined position about electronic device 10. Screen protector 82 can be aligned with display 14 by affixing it through aperture 114 of core 110 once core 110 has been positioned over posts 52, 72 of tool 30C, securing tool 30C against electronic device 10 in a predetermined position. In some embodiments, alignment apertures 116, 118 are positioned such that tool 30C fits snugly to an electronic device 10 positioned in interior 32, thereby centering electronic device 10 as described above.

In some embodiments, a single tool 30C can be used with multiple sizes of electronic devices 10. Each electronic device 10 may have an associated core 110 having alignment apertures 116, 118 positioned to a snugly fit tool 30C to electronic device and align aperture 114 with display 14 when the electronic device 10 is positioned in the interior 32 of tool 30C.

In some embodiments, a screen protector 82 is affixed to a display 14 on a front surface 12 of electronic device 10 using tool 30C. Electronic device 10 is positioned within interior 32 of tool 30C such that feature 28 is received within an opening 104. The receiving ends 54, 74 receive corresponding received ends 56, 76 and first segment 40C is moved towards second segment 60C to align electronic device 10 within tool 30C. Alignment apertures 116, 118 of core 110 are positioned on corresponding posts 52, 72 of tool 30C, aligning aperture 114 of core 110 with display 14 of electronic device 10.

A screen protector assembly 80A (FIG. 16) is provided. A first removable film 88 is removed from the back surface 86 of screen protector 82 using tab 90 to expose the adhesive on back surface 86 of screen protector 82. Screen protector 82 is then aligned with display 14 of electronic device 10 through aperture 114 in core 110. Pressure is applied to top surface 84 of aligned screen protector 82 to affix screen protector 82 to display 14. In other examples, screen protector 82 is attached, directly or indirectly, over aperture 114 and then applied to the electronic device. In either case, the electronic device 10 with affixed screen protector 82 is then removed from tool 30C and the second removable film 92 is removed from top surface 84 of screen protector 82.

Figure 20:
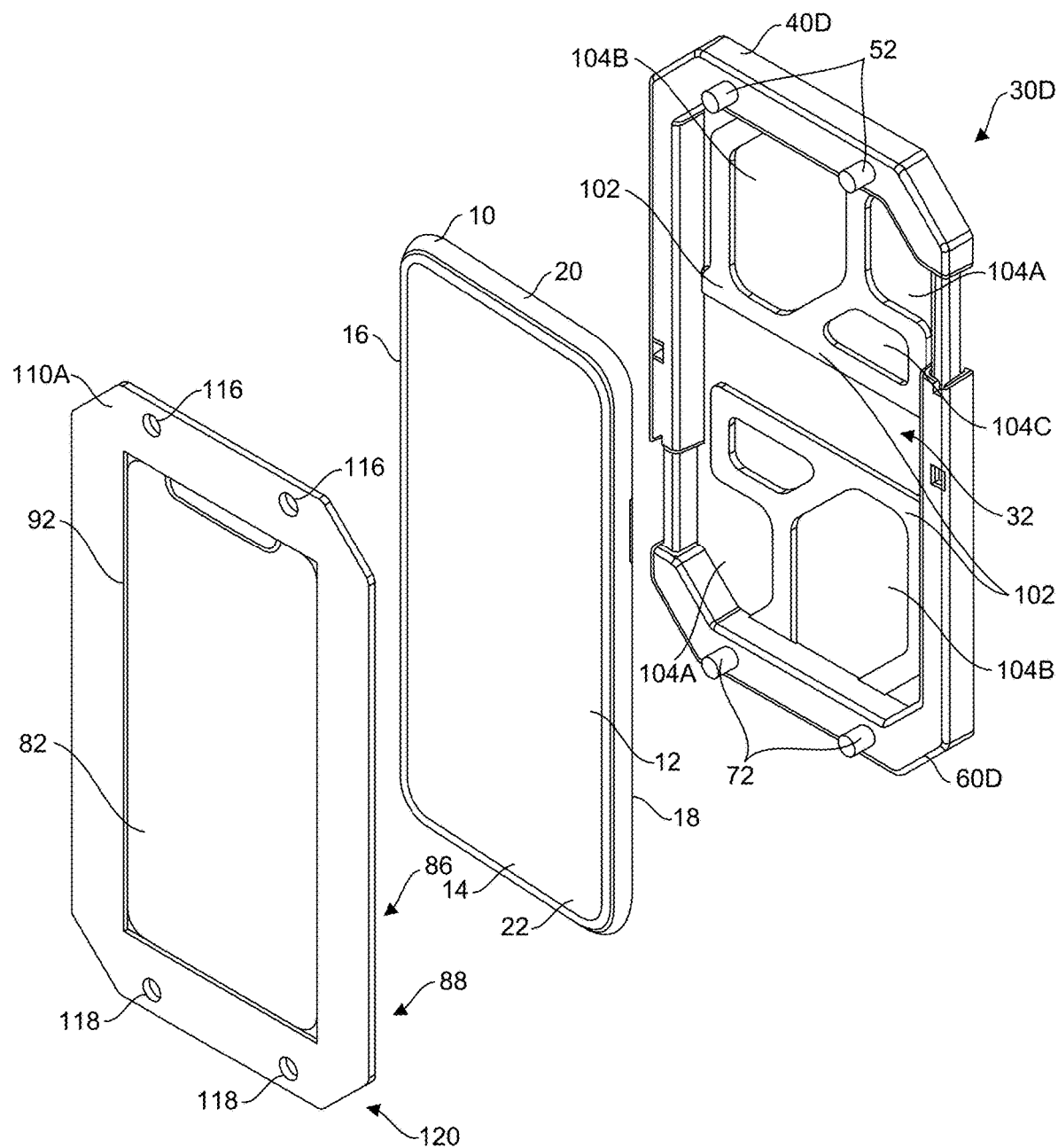
FIG. 20 illustrates a second exemplary exploded view of the tool of FIG. 17.

Referring next to FIG. 20, an exemplary tool 30D for aligning and installing a screen protector 82 (see FIG. 16) onto an electronic device 10 is illustrated. In some embodiments, tool 30D includes components or features similar to those described above with respect to tool 30, tool 30A, tool 30B, and/or tool 30C, and similar part numbers are used to indicate similar components in FIG. 20.

Tool 30D further includes core 110A. Core 110A is illustratively formed a semi-rigid material to prevent core 110A from stretching once it is received on posts 52 of first segment 40D and posts 72 of second segment 60D. Exemplary semi-rigid materials include foam, thermoplastic, cardboard, and paperboard. In some exemplary embodiments, core 110A is formed from a die-cut or laser-cut piece of material. Second removable film 92 releasably affixes screen protector 82 to core 110A.

In some embodiments, a screen protector 82 is affixed to a display 14 on a front surface 12 of electronic device 10 using tool 30D. Electronic device 10 is positioned within interior 32 of tool 30D such that feature 28 is received within an opening 104. The receiving ends 54, 74 receive corresponding received ends 56, 76 and first segment 40D is moved towards second segment 60D to align electronic device 10 within tool 30D.

A first removable film 88 is removed from the back surface 86 of screen protector 82 using a tab 90 (not shown in FIG. 20) to expose the adhesive on the back surface 86 of screen protector 82. The alignment apertures 116, 118 of core 110A are positioned on corresponding posts 52, 72 of tool 30D, aligning core 110A and screen protector 82 with display 14 of electronic device 10.

Pressure is applied to top surface 84 of aligned screen protector 82 to release screen protector 82 from second removable film 92 and core 110A, thereby affixing screen protector 82 to display 14. The electronic device 10 with affixed screen protector 82 is then removed from tool 30D.

In some embodiments, an installation tool, such as tool 30, tool 30A, tool 30B, tool 30C, or tool 30D is provided as a kit with a screen protector 82. In some embodiments, the screen protector 82 provided with the kit is provided as part of a screen protector assembly, such as screen protector assembly 80 or screen protector assembly 80A, or as part of an assembly 120.

Figure 21:
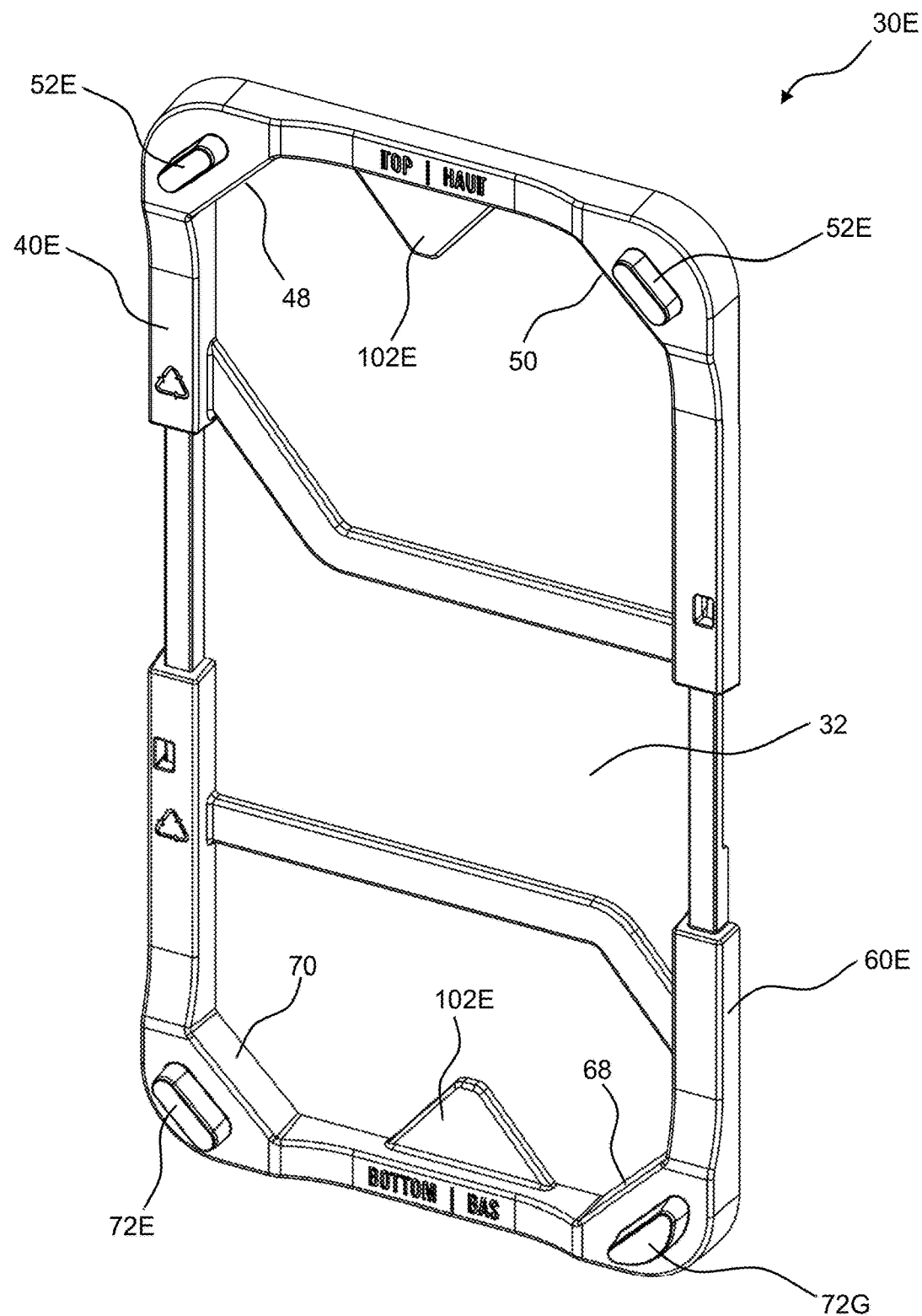
FIG. 21 illustrates a perspective view of another exemplary tool for installing a screen protector on an electronic device.

FIG. 21 illustrates a perspective view of another exemplary tool 30E for installing a screen protector on electronic device 10. Tool 30E may be an example of any of tools 30, 30A, 30B, 30C, and/or 30D. Tool 30E and each of its components may include any of the features, elements, design, characteristics, and/or function of any of tools 30, 30A, 30B, 30C, 30D, and/or their components. Tool 30E includes a first segment 40E and a second segment 60E. First segment 40E is illustratively moveable relative to second segment 60E to accommodate a range of sizes of electronic device 10 as discussed in prior examples. In some exemplary embodiments, first segment 40E and second segment 60E are movably or slidably coupled relative to each other to receive electronic devices 10 having different lengths and/or widths.

First segment 40E and second segment 60E define an interior 32 of tool 30E for receiving electronic device 10. First corner alignment feature 48 and second corner alignment feature 50 are configured to align received electronic device 10 within the interior 32 of tool 30E to allow proper alignment during installation of screen protector 82. In some embodiments, each corner alignment feature 48, 50 is a surface at an angle greater than 0° and less than 90° with respect to the sides of tool 30E. In some embodiments, each corner alignment feature 48, 50 forms an angle with a side as little as 10°, 20°, 30°, 40°, 45°, as great as 50°, 60°, 70°, 80°, or within any range defined between any two of the foregoing values, such as 10° to 80°, 30° to 60°, or 40° to 50°.

First segment 40E illustratively includes one or more posts 52E configured to receive a screen protector assembly 100 including screen protector 82 (see FIG. 21). Each post 52E extends substantially perpendicularly from first segment 40E. In other embodiments, one or more posts 52E may be angled away from interior 32. In some embodiments each post 52E may have a tapered shape or other non-uniform shape. In some embodiments, one or more of posts 52E may have a ridge, spine, recess, or sharp edge which tends to grab or hold onto an item placed over the post by forming a frictional fit with item and/or cutting very slightly into the surface of softer items, such as cardboard.

Second segment 60E includes a first corner alignment feature 68 and a second corner alignment FIG. 70. Each corner alignment feature 68, 70 is configured to align received electronic device 10 within the interior 32 of tool 30E to allow proper alignment during installation of the screen protector 82. In some embodiments, each corner alignment feature 68, 70 is a surface at an angle greater than 0° and less than 90° with respect to second side 64, such as the 45° illustrated in FIG. 21. In some embodiments, each corner alignment feature 68, 70 forms an angle as little as 10°, 20°, 30°, 40°, 45°, as great as 50°, 60°, 70°, 80°, or within any range defined between any two of the foregoing values, such as 10° to 80°, 30° to 60°, or 40° to 50°.

Second segment 60E includes one or more posts. Specifically, the example of FIG. 21 includes a post 72E and a post 72G having a cross sectional shape that is different than post 72E and/or posts 52E. Like posts 52E, posts 72E and 72G may also have different orientations from each other. The shapes, positions, and rotational orientation of posts 52E, 72E, and 72G provide a keying function which reduces the number of ways a screen protector assembly can be installed on tool 30E (discussed in greater detail with respect to FIG. 22).

In some embodiments, the angled surfaces of the respective alignment features 48, 50, 68, 70 allow tool 30E to receive electronic devices having a variety of lengths and widths. When the electronic device 10 is received within interior 32 of assembled tool 30E and the first segment 40E is moved towards the second segment 60E, each of the corners of electronic device 10 contacts the angled surface of a respective alignment feature 48, 50, 68, 70 of the tool 30E. Opposing forces applied to first segment 40E and 60E toward each other will tend to center electronic device 10 within tool 30E.

Figure 22:
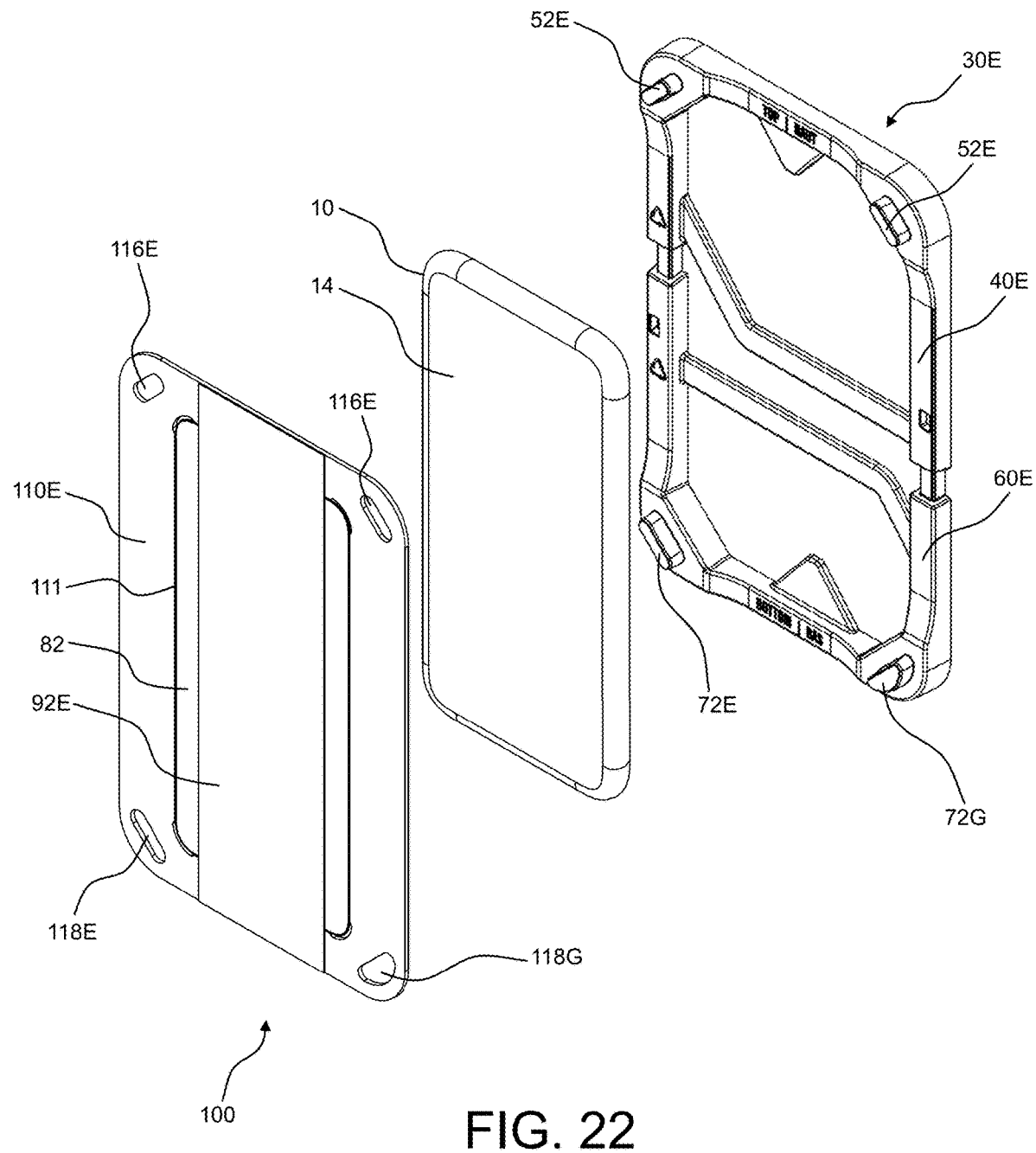
FIG. 22 illustrates an exemplary exploded view of the tool of FIG. 21.

FIG. 22 illustrates an exemplary exploded view of tool 30E with a screen protector assembly 100. Screen protector assembly 100 includes core 110E. Core 110E is illustratively formed a semi-rigid material to keep assembly 100 substantially flat as well as prevent core 110E from stretching once it is received on the posts of tool 30E. Exemplary semi-rigid materials include foam, thermoplastic, cardboard, and paperboard. In some exemplary embodiments, core 110E is formed from a die-cut or laser-cut piece of material. Core 110E includes an aperture 111 with corresponds with some or all of the perimeter of screen protector 82 for purposes of aligning screen protector 82 with respect to tool 30E and electronic device 10. Core 110E includes alignment apertures 116E which correspond in size, shape, and position to posts 52E. Core 110E also includes alignment apertures 118E and 118G which correspond to posts 72E and 72G, respectively. Because post 72G and alignment aperture are different shapes than the other posts and alignment apertures, core 110E is 'keyed' in that it can only be engaged with or positioned on the posts of tool 30E in one way, thereby providing a preferred orientation and reducing the chance of errors.

Further, alignment apertures 116E are spaced apart from alignment apertures 118 E and 118G a distance which corresponds to the distances between posts 52E, 72E, and 72G when tool 30E is closed around electronic device 10. In other words, another core which corresponds to another electronic device that is a different size than electronic device 10 will have different alignment aperture spacings which correspond to the spacing of the posts of tool 30E when it is closed around this other electronic device. It should be understood that many other shapes, sizes, positions, quantities, and orientations of posts and alignment features are possible. The spacing corresponds to the spacing and position of the posts on tool 30E when it is firmly closed on an electronic device having a particular size. As discussed previously, one or more of the posts may have a ridge, spine, recess, rough edge, or sharp edge which tends to grab or hold onto core 110E when it is placed over the posts by forming a frictional fit and/or cutting very slightly into core 110E.

Positioning film 92E is adhered to core 110E at or near its ends. Screen protector 82 is releasably affixed to positioning film 92E in aperture 111. In this way, core 110E, positioning film 92E and screen protector comprise a single assembly until screen protector 82 is installed on electronic device 10. Electronic device 10 is positioned within interior 32 of tool 30E and electronic device 10 is centered within tool 30E as described in previous examples.

A first removable film 88 is removed from back surface 86 of screen protector 82 using a tab 90 to expose the adhesive on the back surface 86 of screen protector 82 (removable film, back surface 86, and tab 90 not visible in FIG. 22). The alignment apertures 116E, 118E, and 118G of core 110E are positioned on corresponding posts 52E, 72E, and 72G of tool 30E, thereby aligning screen protector 82 with display 14 of electronic device 10.

Pressure is applied to the aligned screen protector 82 to adhere or affix screen protector 82 to display 14. Beneficially, core 110E holds the posts of tool 30E during the application process such that tool 30E does not open or allow electronic device 10 to move. Further, screen protector is aligned with a preferred installation location and orientation on display 14 such that the user does not have to try to manually position or align the screen protector. Then, core 110E is removed from the posts of tool 30E. The screen protector 82 remains affixed to electronic device 10 and positioning film 92E pulls away from screen protector 82. Electronic device 10 with attached screen protector 82 is then removed from tool 30E. In some embodiments, screen protector assembly 100 and tool 30E are provided together in the form of a kit. The kit may also include an instruction sheet, a cleaning cloth, a cleaning wipe, a lint removal pad, and/or a cleaning solution.

FIG. 21 illustrates a perspective view of another exemplary tool 30F for installing a screen protector on electronic device 10. Tool 30F may be an example of any of tools 30, 30A, 30B, 30C, 30D, and/or 30E. Tool 30F and each of its components may include any of the features, elements, design, characteristics, and/or function of any of tools 30, 30A, 30B, 30C, 30D, 30E and/or their components. Tool 30F includes a first segment 40F and a second segment 60F. First segment 40F is illustratively moveable or slidable relative to second segment 60F to accommodate a range of sizes of electronic device 10. In some exemplary embodiments, first segment 40F and second segment 60F are slidably coupled relative to each other to receive electronic devices 10 having different lengths and/or widths.

First segment 40F and second segment 60F define an interior 32 of tool 30F for receiving electronic device 10. First corner alignment feature 48 and second corner alignment feature 50 are configured to align received electronic device 10 within the interior 32 of tool 30F to allow proper alignment during installation of screen protector 82. In some embodiments, each corner alignment feature 48, 50 is a surface at an angle greater than 0° and less than 90° with respect to the sides of tool 30F. In some embodiments, each corner alignment feature 48, 50 forms an angle with a side as little as 10°, 20°, 30°, 40°, 45°, as great as 50°, 60°, 70°, 80°, or within any range defined between any two of the foregoing values, such as 10° to 80°, 30° to 60°, or 40° to 50°.

Figure 27:
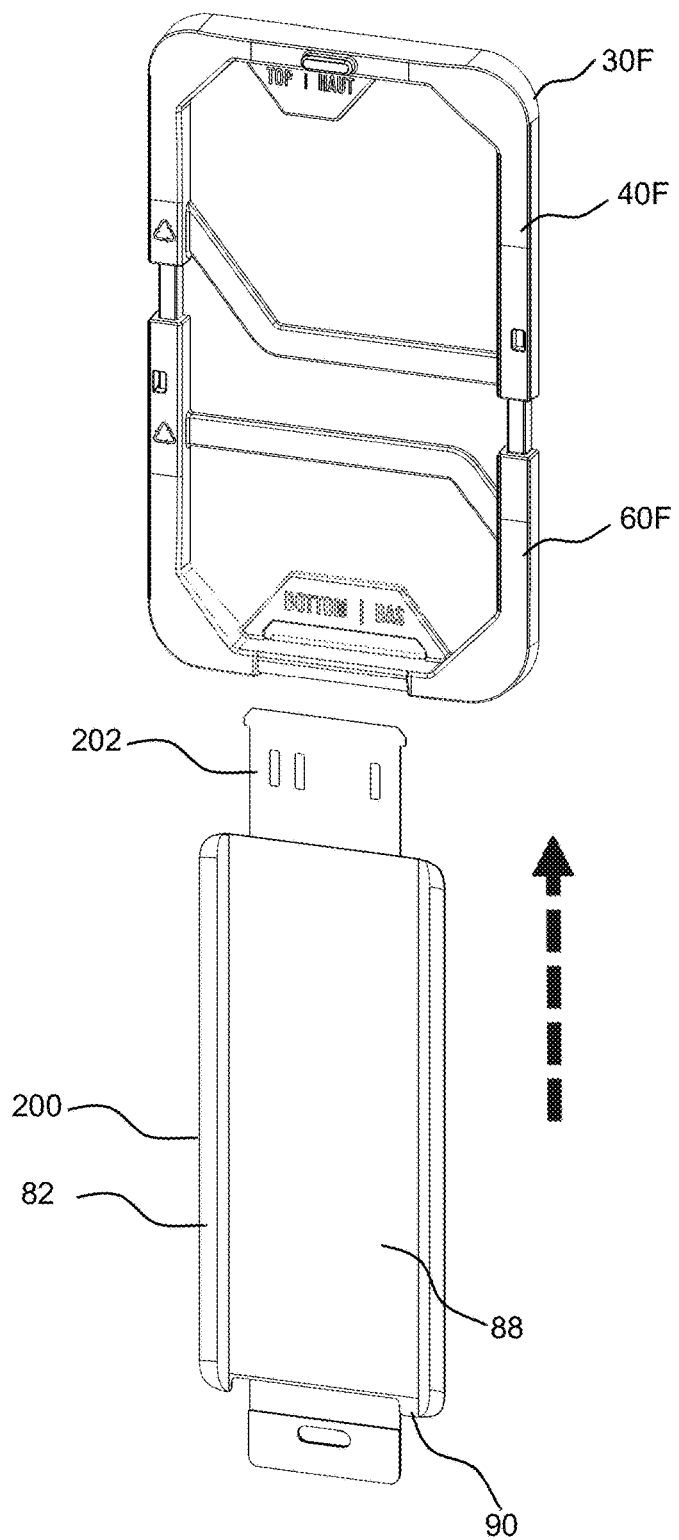
FIG. 27 illustrates the insertion of the screen protector assembly of FIG. 26 into the tool of FIG. 23.

First segment 40F illustratively includes one or more posts 52F configured to receive a screen protector assembly 200 including screen protector 82 (see FIG. 27). Each post 52F extends substantially perpendicularly from first segment 40F. In other embodiments, one or more posts 52F may be angled away from interior 32. In some embodiments each post 52F may have a tapered shape. In some embodiments, one or more of posts 52F may have a ridge, spine, recess, or sharp edge which tends to grab or hold onto an item placed over the post by forming a frictional fit with item and/or cutting very slightly into the surface of softer items.

Second segment 60F includes a first corner alignment feature 68 and a second corner alignment FIG. 70. Each corner alignment feature 68, 70 is configured to align received electronic device 10 within the interior 32 of tool 30F to allow proper alignment during installation of the screen protector 82. In some embodiments, each corner alignment feature 68, 70 is a surface at an angle greater than 0° and less than 90° with respect to second side 64. In some embodiments, each corner alignment feature 68, 70 forms an angle as little as 10°, 20°, 30°, 40°, 45°, as great as 50°, 60°, 70°, 80°, or within any range defined between any two of the foregoing values, such as 10° to 80°, 30° to 60°, or 40° to 50°.

Second segment 60F includes a groove, recess, or channel 171 that extends along the bottom edge and/or bottom front edge of second segment 60F. Second segment 60F also includes a slot 173 that is accessible from the bottom edge and/or the bottom back edge of second segment 60F. The use of channel 171 and slot 173 are discussed further in the discussions of FIGS. 26 and 27.

Figure 24:
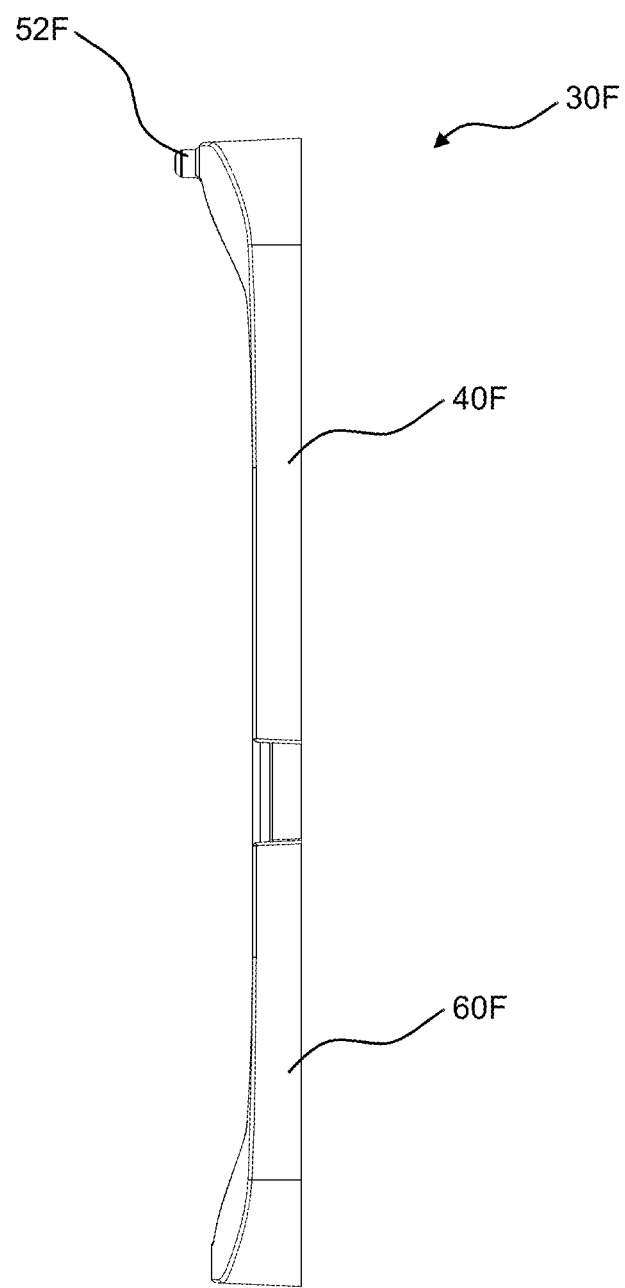
FIG. 24 illustrates a side view of the tool of FIG. 23.

FIG. 24 illustrates a side view of tool 30F. Both the top end and the bottom end of tool 30F include ramped regions which result in each of the top end and the bottom end extending up above the primary top surface of tool 30F. In some examples, the top ramped region may be taller and/or may extend further from the primary planar surface than the bottom ramped region does (even when the height of post 52F is not considered in the height).

Figure 23:
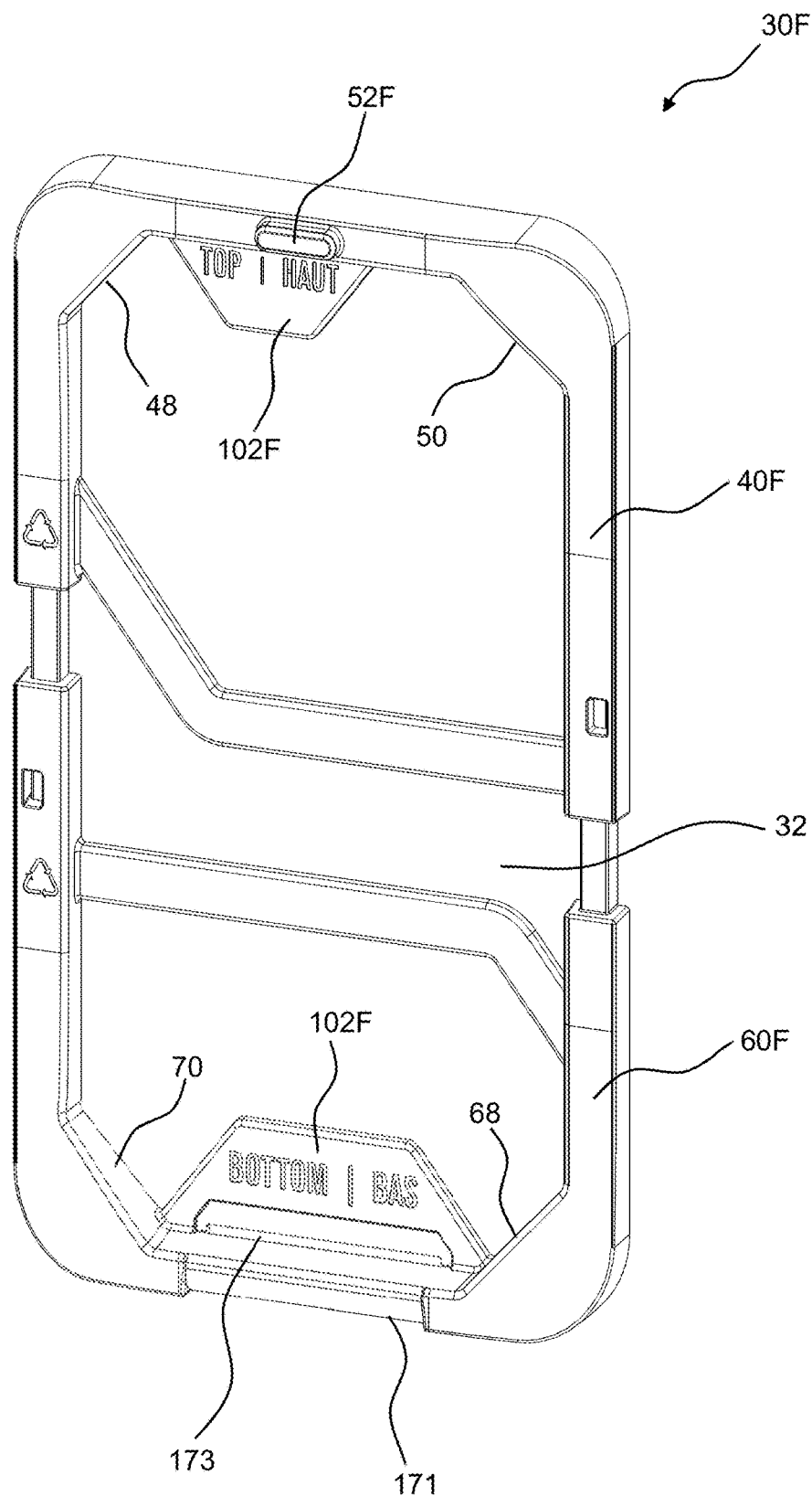
FIG. 23 illustrates a perspective view of another exemplary tool for installing a screen protector on an electronic device.
Figure 25:
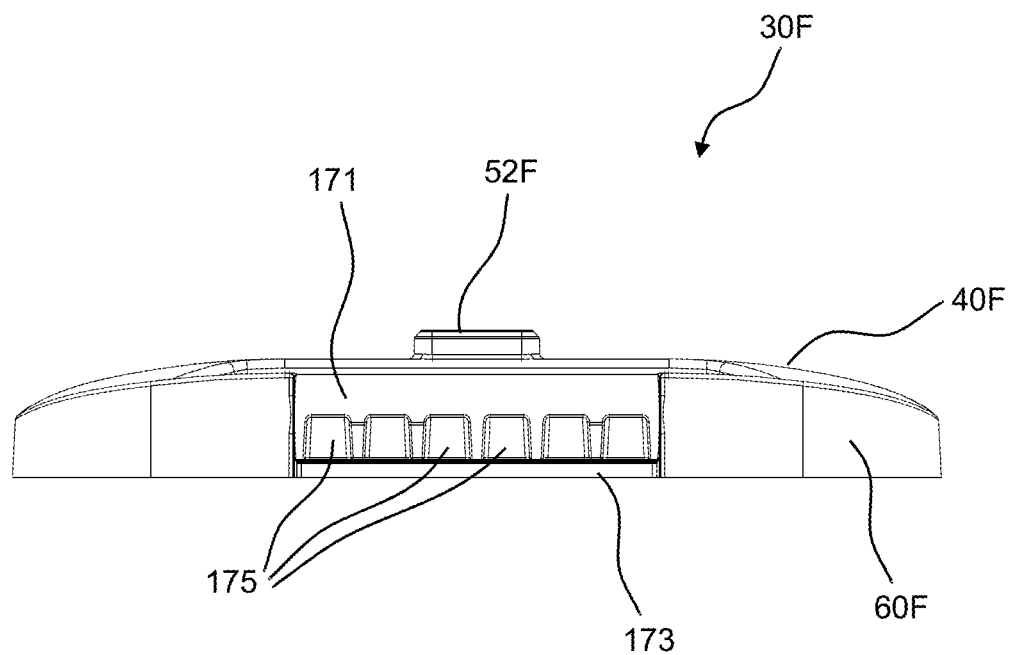
FIG. 25 illustrates a bottom view of the tool of FIG. 23.

FIG. 25 illustrates a bottom view of tool 30F. As discussed above with respect to FIG. 24, first segment 40 may have a slightly greater overall height than second segment 60F (making it slightly visible in the bottom view of FIG. 25). FIG. 25 also illustrates a downward facing plurality of teeth 175 which are not shown in FIG. 23. Teeth 175 extend downward into the channel 171 which extends around at least a portion of the bottom of second segment 60F. Other examples may have more or fewer teeth than illustrated in FIG. 25.

Figure 26:
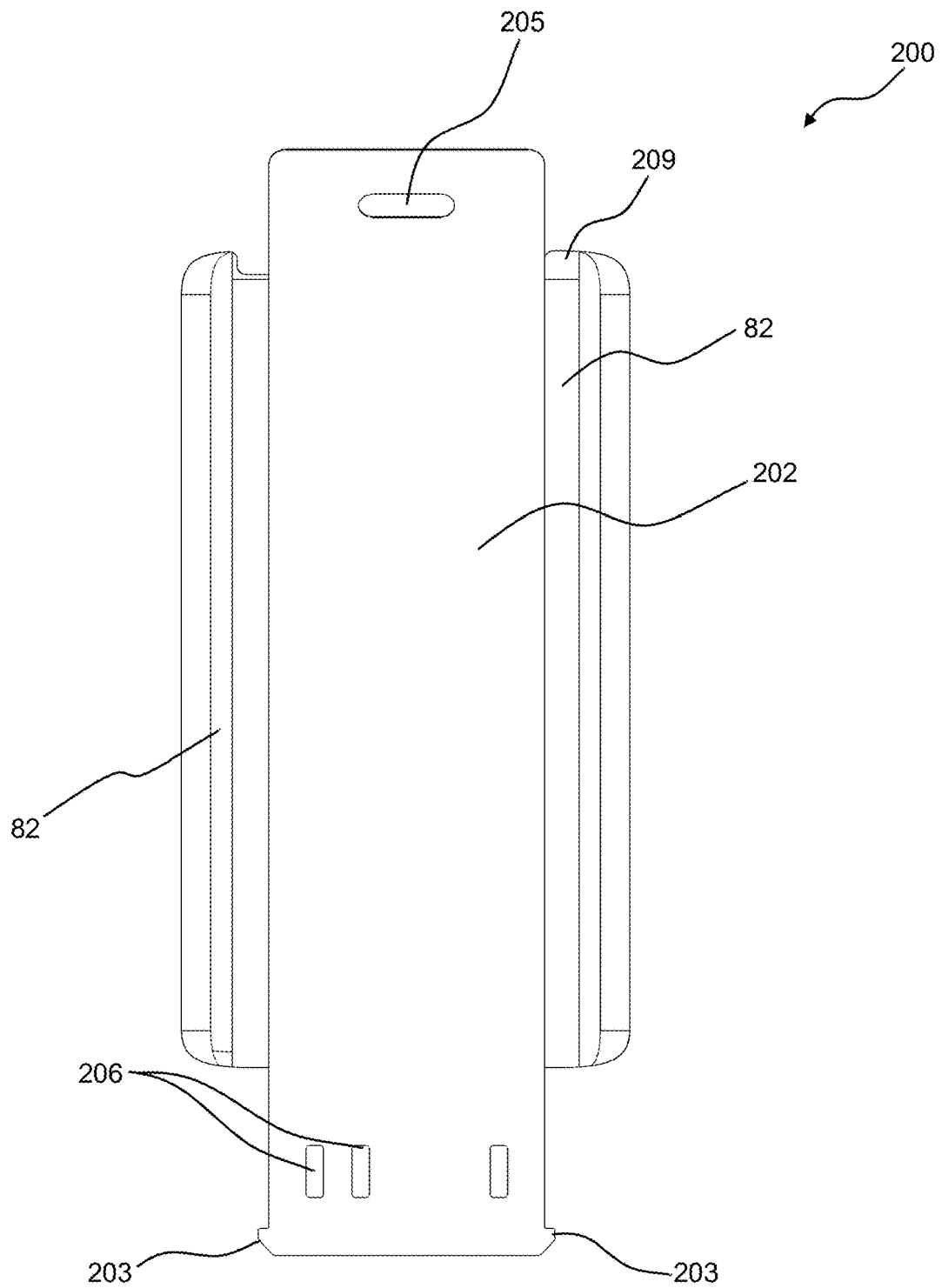
FIG. 26 illustrates a screen protector assembly to be used with the tool of FIG. 23.

FIG. 26 illustrates a screen protector assembly 200 configured to be used with tool 30F. Screen protector assembly 200 includes screen protector 82 removably adhered to the back surface of an application film 202. In the example of FIG. 26, screen protector 82 is a glass screen protector which has curved edges. However, screen protector assembly 200 may also include a flat glass screen protector and/or a screen protector made from a flexible material. Application film 202 includes a post aperture 205. Application film also includes a plurality of alignment apertures 206 which correspond to one or more of teeth 175 of tool 30F. Finally, application film 202 includes retention tabs 203 which are discussed in further detail below in the description of FIG. 27.

Application film 202 has a width which corresponds to a width of slot 171 of tool 30F. The bottom end of application film 202 of screen protector assembly 200 is inserted into slot 171 in the direction indicated by the dashed arrow in FIG. 27. Since retention tabs 203 extend to a width greater than the width of slot 171 of tool 30F, application film 202 is inserted by temporarily bending retention tabs 203 to allow the end of application film 202 to fit into slot 171. Once inserted, retention tabs 203 relax or return to their primarily planar state and screen protector assembly 200 is then removably connected to tool 30F in a floating manner.

Figure 28:
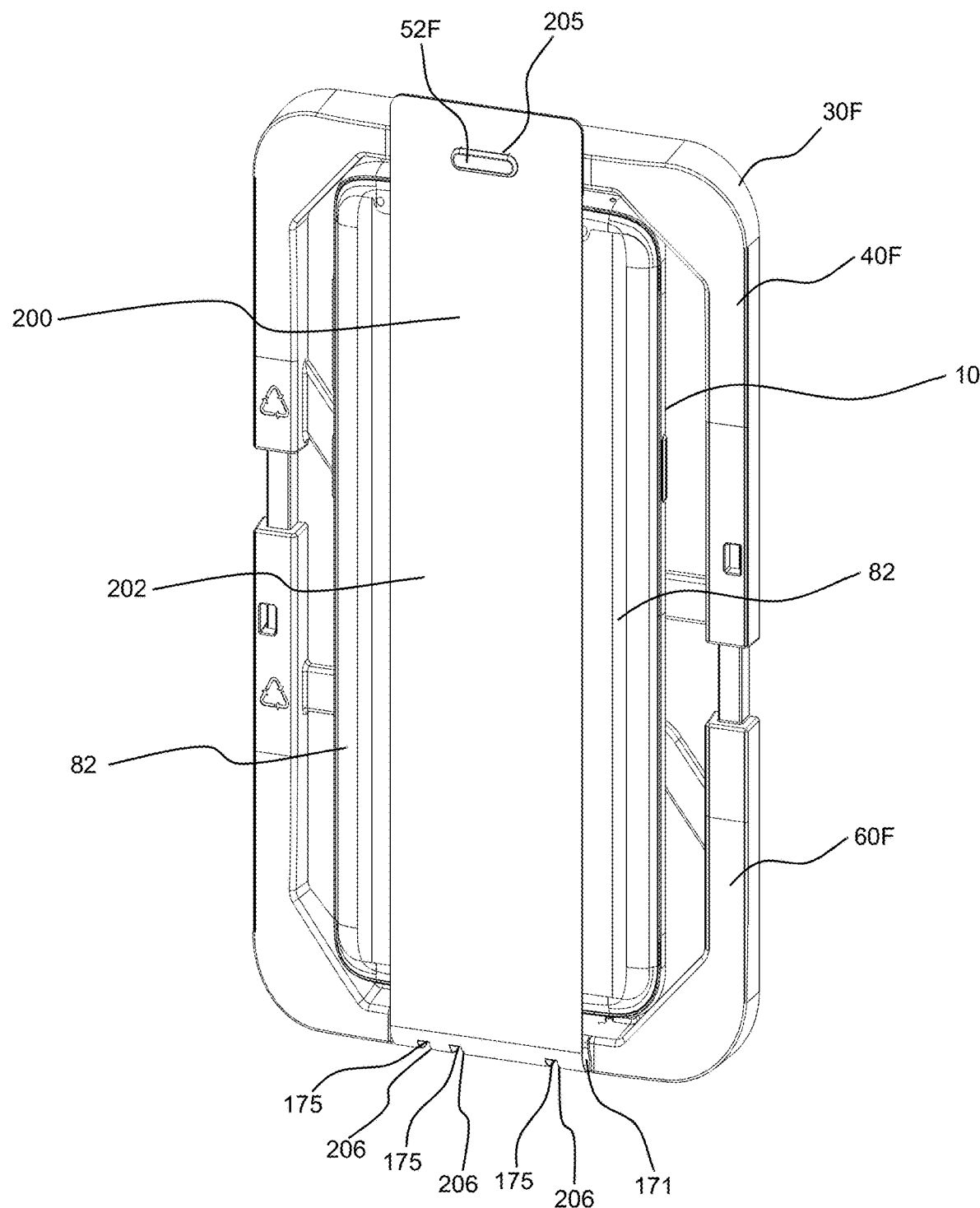
FIG. 28 illustrates the tool of FIG. 23 and the screen protector assembly of FIG. 26 in use with an electronic device 10.

After inserting application film 202 into slot 171 and centering electronic device in tool 30F as described in the examples above, removable film 88 is removed from the surface of screen protector 82 using a gripping tab 90 to expose an adhesive on the surface of screen protector 82. Screen protection assembly 200 is then bent upwards around the front of tool 30F, while still remain attached in slot 173, as illustrated in FIG. 28. The bottom portion of application film 202 fits into channel 171 and is aligned or centered by channel 171. Application film 202 has an overall length that has been chosen such that screen protector assembly 200 must be pulled taut in order to place post aperture 205 of screen protector assembly 200 over post 52F of tool 30F. In other words, the length of screen protector assembly 200 and the position of post aperture 205 corresponds to the location of post 52F when tool 30F is closed on a particular electronic device 10. Therefore, the length of screen protector assembly 200 and/or the position of post aperture 205 corresponds with a particular electronic device 10. The position of screen protector 82 on screen protector assembly 200 also corresponds to the position of a particular electronic device 10 in tool 30F.

Teeth 175 of tool 30F may also extend into or through alignment apertures 206 of screen protector assembly 200 to further center, align, and/or stabilize the position of screen protector assembly 200 relative to tool 30F and electronic device 10. Although contact between screen protector 82 and electronic device 10 may or may not have already begun when screen protector assembly 200 is place over post 52F, the user may press screen protector assembly 200 down further to fully adhere screen protector 82 to display 14 of electronic device 10. The differing heights of first segment 40F and second segment 60F discussed above may result in contact between screen protector 82 and display 14 first occurring at the bottom end before that contact propagates toward the top. This 'wavefront' approach to the application is often preferred because it reduces the number of air bubbles that may be trapped in the process.

After screen protector 82 has been firmly adhered to display 14, application film 202 may be removed from post 52F and peeled back. The adhesive holding screen protector 82 to application film 200 is weaker than the adhesive holding screen protector to display 14. Therefore, screen protector 82 remains attached to display 14 and application film 202 pulls away from screen protector 82 leaving screen protector installed and properly aligned on display 14 of electronic device 10. Electronic device 10 can then be removed from tool 30F and application film 202 can be removed from slot 171 of tool 30F. Beneficially, tool 30F may be used with electronic devices of various sizes as long as the dimensions of screen protector assembly 200 and the position of screen protector 82 on screen protector assembly 200 are chosen to product the correct fit to tool 30F and alignment to electronic device 10 when electronic device 10 is in tool 30F.

Figure 29:
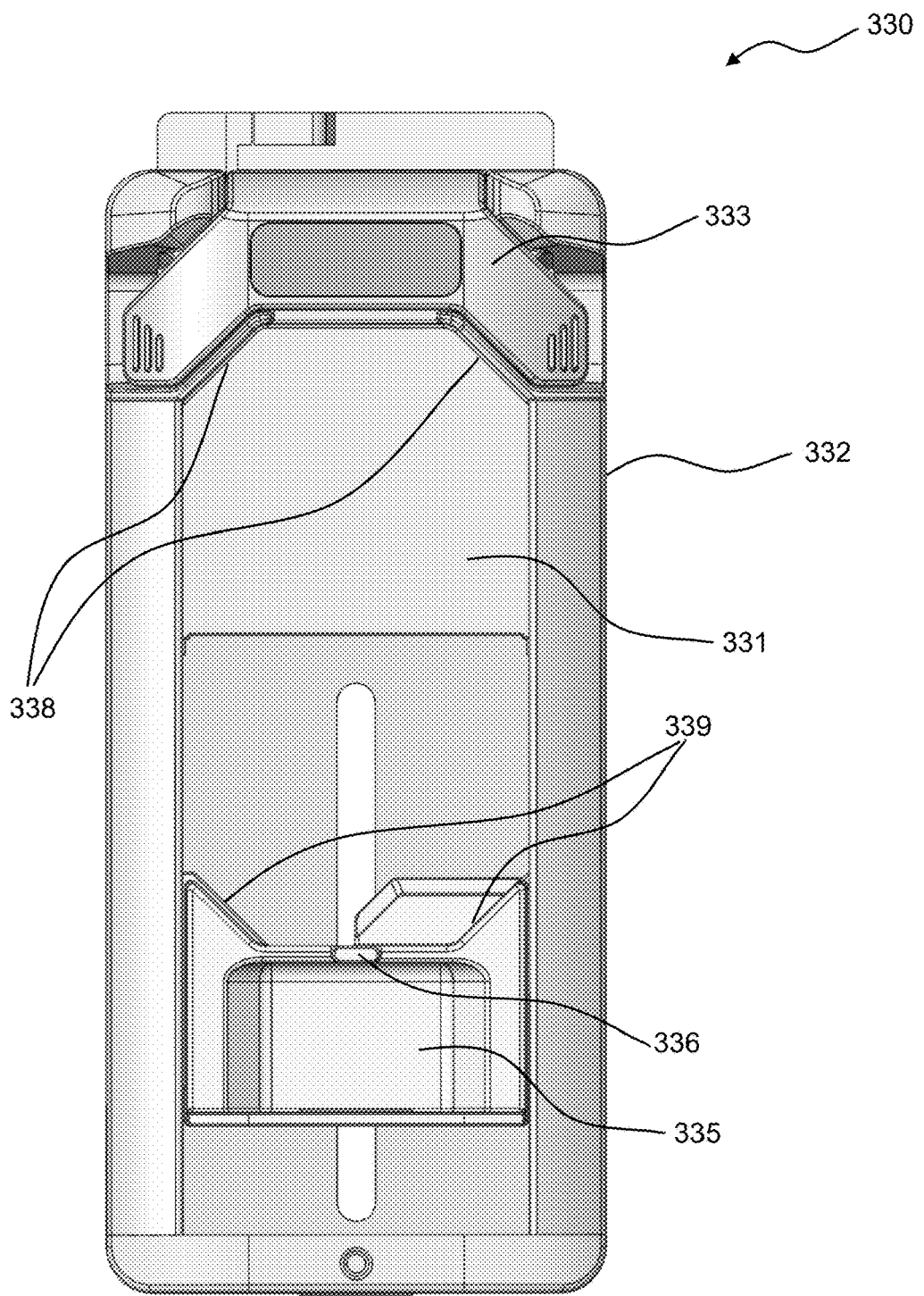
FIG. 29 illustrates another exemplary tool for installing a screen protector.

FIG. 29 illustrates another exemplary tool 330 for use with a screen protector assembly for applying a screen protector of a screen protector assembly to an electronic device. Tool 330 may include any of the elements, components, features, or functions of any of the other tools disclosed herein, including combinations thereof. Tool 330 may also be referred to as a fixture or a jig.

Tool 330 includes a body 332 and an alignment block 335. Body 332 forms a recess, pocket, or cavity which makes up interior 331 of body 332. Body 332 may also be referred to as a tray. As discussed in further detail below, an electronic device, such as electronic device 90, is placed into interior 331 for installation of a screen protector. On one end, interior 331 is partially bounded by corner alignment features 338. Each corner alignment feature 338 forms an angle between an end and a side of interior 331. The angle formed by each of corner alignment features 338 may be as little as 10°, 20°, 30°, 40°, 45°, as great as 50°, 60°, 70°, 80°, or within any range defined between any two of the foregoing values, such as 10° to 80°, 30° to 60°, or 40° to 50°.

Alignment block 335 is slidably attached to interior 331 of body 332 such that it can slide or move along interior 331 toward corner alignment features 338. Alignment block 335 includes corner alignment features 339. Each corner alignment feature 339 forms an angle between alignment block 335 and a side of interior 331. The angle formed by each of corner alignment features 339 may be as little as 10°, 20°, 30°, 40°, 45°, as great as 50°, 60°, 70°, 80°, or within any range defined between any two of the foregoing values, such as 10° to 80°, 30° to 60°, or 40° to 50°. When electronic device 90 is placed in interior 331 and alignment block 335 slides toward corner alignment features 338, corner alignment features 338 and 339 eventually contact the corners of electronic device 90 and center it as described in previous examples herein.

Tool 330 includes one or more springs, springing elements, elastic elements, or biasing elements (not visible in FIG. 29) which tend to push or slide alignment block 335 toward corner alignment features 338 when no other forces are applied. This tends to automatically center electronic device 90 in interior 331 without any other action or force by the user. The user may pull alignment block 335 back against the spring force to insert electronic device 90 and then release alignment block 335 to complete the rest of the screen protector installation. Tool 330 also includes a hinged or pivoting arm 333 which is in a closed position in FIG. 29.

Figure 30:
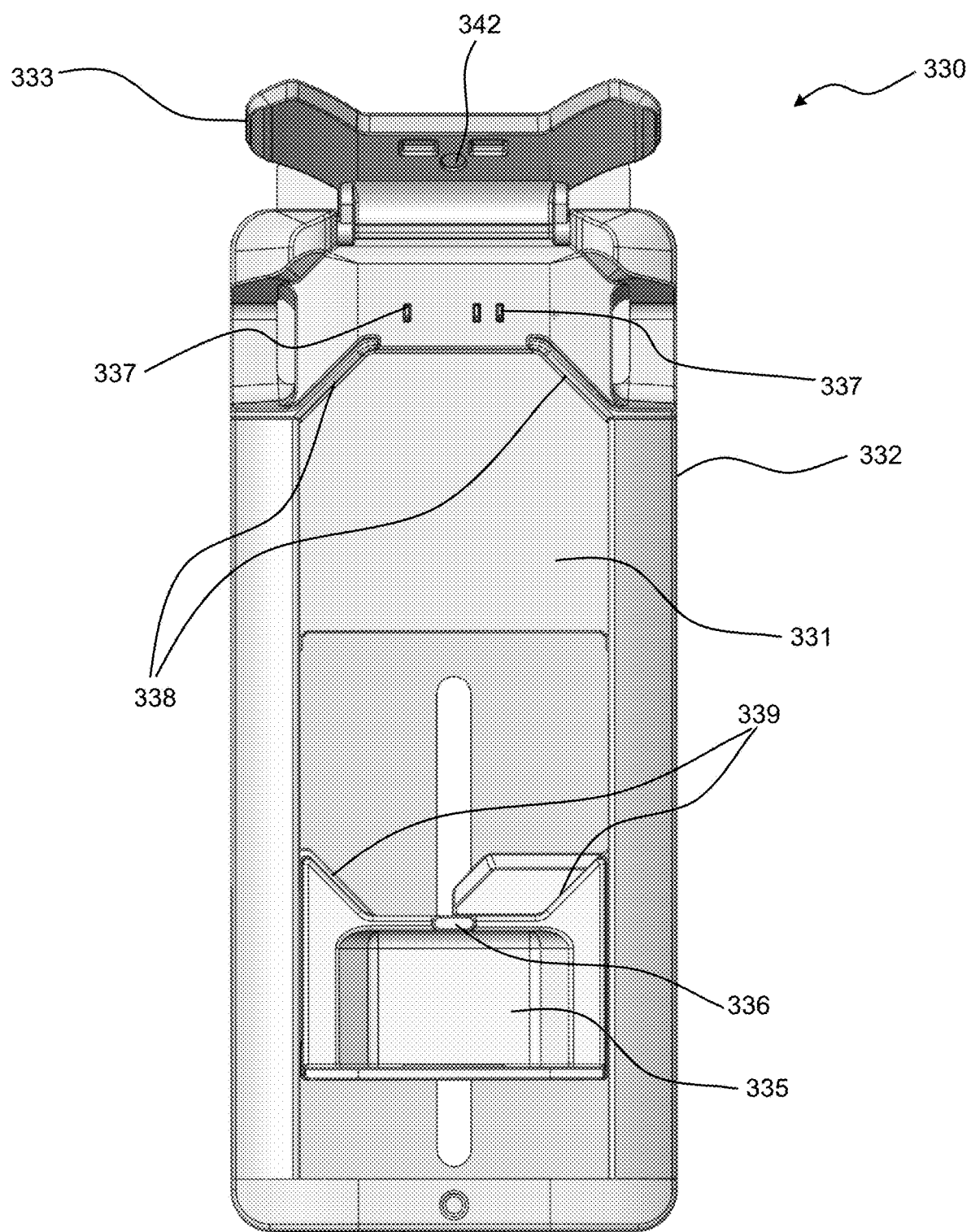
FIG. 30 illustrates another view of the tool of FIG. 29.

In FIG. 30, arm 333 is in an opened position. Posts 337 are positioned under arm 337. Posts 337 may also be referred to as lugs, engagement points, or engagement features. Alignment block 335 also includes a post 336, which also may be referred to as a lug, engagement point, or engagement feature. When arm 333 is in the opened position and alignment block 335 is against an inserted electronic device, a screen protector assembly may be placed on post 336 and posts 337. Other quantities of posts 336 and/or 337 may be used. Posts 336 and/or 337 may also have differing shapes or positions to perform a keying function such that a screen protector assembly may only be placed over the posts in a single or limited number of orientations. The size of the screen protector and the spacing of the apertures on the screen protector assembly correspond to the distance between posts 336 and posts 337 for a particular electronic device.

The screen protector assembly may be similar to screen protector assembly 200 of prior examples and may be applied in a manner similar to that illustrated in FIG. 28. After a screen protector assembly is applied to tool 330, arm 333 may be returned to the closed position of FIG. 29 to hold the screen protector assembly in place while the rest of the installation is completed. One or more of arm 333 and body 332 may have a magnetic element, such as magnet 342, for temporarily holding arm 333 in the closed position. The other of arm 333 and body 332 may have a metallic element or may have a corresponding magnet. Once the screen protector is adhered to the surface of electronic device 90, arm 333 is opened to remove the remaining portion of the screen protector assembly.

The elements, components, and steps described herein are meant to exemplify some types of possibilities. In no way should the aforementioned examples limit the scope of the invention, as they are only exemplary embodiments. Moreover, the figures provided are meant to illustrate certain features of the embodiments. Unless otherwise noted, they are not provided to scale.

The phrases "in some embodiments," "according to some embodiments," "in the embodiments shown," "in other embodiments," "in some examples," "in other examples," "in some cases," "in some situations," "in one configuration," " "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations of the disclosed techniques may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention, except as limited by the prior art.

What is claimed is:

1. A kit comprising:
    a screen protector assembly comprising:
        a screen protector having a front surface and an opposing rear surface;
        a first removable film adapted to at least partially cover the rear surface of the screen protector; and
        a second removable film adapted to at least partially cover the front surface of the screen protector; and
    a screen protector installation tool comprising:
        a first segment having a first corner alignment feature and a second corner alignment feature;
        a second segment having a first corner alignment feature and a second corner alignment feature, wherein the second segment slidably engages the first segment of the screen protector installation tool, wherein the first and second corner alignment features of the first segment and the first and second corner alignment features of the second segment are adapted to center an electronic device in the screen protector installation tool when one of the first segment and the second segment of the screen protector installation tool slides over the other of the first segment and the second segment of the screen protector installation tool; and
        a biasing element configured to apply a force to slide the one of the first segment and the second segment of the screen protector installation tool over the other of the first segment and the second segment of the screen protector installation tool such that the corner alignment features of both the first and second segments contact respective corners of the electronic device.

2. The kit of claim 1 further comprising one or more posts extending from one of the first segment and the second segment of the screen protector installation tool, wherein the one or more posts are adapted to engage an aperture in the screen protector assembly for positioning the screen protector assembly over the electronic device when the electronic device is positioned on the screen protector installation tool.

3. The kit of claim 2 wherein the other of the one or the first segment and the second segment of the screen protector installation tool includes an attachment feature configured for attaching the screen protector assembly to the screen protector installation tool opposite the one or more posts.

4. The kit of claim 1 wherein the biasing element comprises one or more elastic bands.

5. The kit of claim 1 wherein the biasing element comprises one or more springs.

6. The kit of claim 1 further comprising a cleaning cloth.

7. The kit of claim 1 further comprising a ratcheting mechanism between the first segment and the second segment.

8. The kit of claim 1 wherein the first segment of the screen protector installation tool includes a first side and a second side parallel to the first side, and wherein the first corner alignment feature forms an angle between 30 degrees and 60 degrees with the first side and the second corner alignment feature forms an angle between 30 degrees and 60 degrees with the second side.

9. The kit of claim 1 wherein the second segment of the screen protector installation tool includes a first side and a second side parallel to the first side, and wherein the first corner alignment feature forms an angle between 30 degrees and 60 degrees with the first side and the second corner alignment feature forms an angle between 30 degrees and 60 degrees with the second side.

10. The kit of claim 1 wherein each of the first segment and the second segment of the screen protector installation tool is configured as a tray which slidably engages the other of the first segment and the second segment.

11. The kit of claim 1 wherein the electronic device is a smartphone and the screen protector installation tool is configured to receive a variety of sizes of smartphones in a receiving area between the corner alignment features.

12. The kit of claim 1 further comprising a second screen protector assembly having a size that is different than a size of the screen protector assembly.

13. The kit of claim 1 wherein the screen protector comprises ruggedized glass.

14. A screen protector installation tool for use with an electronic device and a screen protector assembly that includes a screen protector, the screen protector installation tool comprising:
   a first segment having a first corner alignment feature and a second corner alignment feature;
   a second segment having a first corner alignment feature and a second corner alignment feature, wherein the second segment slidably engages the first segment portion of the screen protector installation tool to form a receiving area for receiving the electronic device between the corner alignment features, wherein the first and second corner alignment features of the first segment and the first and second corner alignment features of the second segment are adapted to align the electronic device in the receiving area of the screen protector installation tool when one of the first segment and the second segment of the screen protector installation tool is moved relative to the other of the first segment and the second segment of the screen protector installation tool to reduce a size of the receiving area between the corner alignment features; and
   an elastic element attached to the first segment and the second segment of the screen protector installation tool and configured to apply a force to move the one of the first segment and the second segment relative to the other of the first segment portion and the second segment of the screen protector installation tool to reduce the size of the receiving area between the corner alignment features.

15. The screen protector installation tool of claim 14 further comprising one or more posts extending from one of the first segment and the second segment of the screen protector installation tool, wherein the one or more posts are adapted to engage an aperture in the screen protector assembly for positioning the screen protector over the electronic device when the electronic device is in the receiving area of the screen protector installation tool.

16. The screen protector installation tool of claim 15 wherein the other of the one or the first segment and the second segment of the screen protector installation tool includes an attachment feature configured for removably attaching the screen protector assembly to the screen protector installation tool opposite the one or more posts.

17. The screen protector installation tool of claim 14 wherein the elastic element comprises one or more elastic bands.

18. The screen protector installation tool of claim 14 further comprising a cleaning cloth.

19. The screen protector installation tool of claim 14 wherein each of the first segment and the second segment of the screen protector installation tool is configured as a tray which slidably engages the other of the first segment and the second segment.

20. The screen protector installation tool of claim 14 wherein the screen protector installation tool is configured to receive a variety of sizes of electronic devices between the corner alignment features.

* * * * *